US007904039B2

(12) United States Patent
Roy

(10) Patent No.: US 7,904,039 B2
(45) Date of Patent: Mar. 8, 2011

(54) MULTI-USER ADAPTIVE ARRAY RECEIVER AND METHOD

(75) Inventor: Sébastien Joseph Armand Roy, Beaumont (CA)

(73) Assignee: Université Laval, Quebec (CA)

( * ) Notice: Subject to any disclaimer, the term of this patent is extended or adjusted under 35 U.S.C. 154(b) by 397 days.

(21) Appl. No.: 10/587,701

(22) PCT Filed: Jan. 31, 2005

(86) PCT No.: PCT/CA2005/000102
§ 371 (c)(1),
(2), (4) Date: Jul. 27, 2006

(87) PCT Pub. No.: WO2005/074147
PCT Pub. Date: Aug. 11, 2005

(65) Prior Publication Data
US 2007/0142089 A1    Jun. 21, 2007

(51) Int. Cl.
*H04B 7/08* (2006.01)
*H04B 1/00* (2006.01)
(52) U.S. Cl. ........ 455/132; 455/137; 455/63.1; 455/506; 375/148; 375/144; 375/349
(58) Field of Classification Search .................. 455/506, 455/63.1, 65, 132, 137; 375/142–144, 148, 375/150, 152, 343, 349; 370/335, 342
See application file for complete search history.

(56) References Cited

U.S. PATENT DOCUMENTS

| 5,515,378 | A | 5/1996 | Roy, III et al. |
| 5,592,490 | A | 1/1997 | Barratt |
| 5,828,658 | A | 10/1998 | Ottersten et al. |
| 6,188,718 | B1* | 2/2001 | Gitlin et al. ................ 375/148 |
| 6,222,498 | B1* | 4/2001 | Ishii et al. ................ 343/853 |
| 6,301,293 | B1* | 10/2001 | Huang et al. .............. 375/130 |

(Continued)

FOREIGN PATENT DOCUMENTS

JP    10-224282    8/1998

(Continued)

OTHER PUBLICATIONS

Sumit Roy, "Subspace Blind Adaptive Detection for Multiuser CDMA", IEEE Trans. on Communications, vol. 48, No. 1, Jan. 2000.* X. Wang & H. V. Poor, "Adaptive joint multiuser detection and channel estimation in multipath fading CDMA channels", Wireless Networks 4, pp. 453-470, 1998.*
J. G. Proakis, Digital Communications, 3rd ed.. New York: McGraw-Hill, 1995, pp. 152-163.

(Continued)

*Primary Examiner* — Duc M Nguyen
(74) *Attorney, Agent, or Firm* — Thomas Adams

(57) ABSTRACT

An array receiver which reduces complexity and cost by exploiting multiuser information in signals received from a plurality of transmitting users preprocesses (40) samples of antenna signals ($x_1, x_2 \ldots, x_N$) from the antenna elements (22/1, ..., 22/N) to form basis signals ($y_O, \ldots, y_M$) together having fewer space-time dimensions than the space-time dimensions of the combined antenna signals. The receiver processes and combines the basis signals to produce sets of estimated received signals ($z_0, \ldots, z_M$), each for a corresponding one of the users. Each of the basis signals comprises a different combination of the antenna signals. The receiver combines the basis signals to provide a user-specific output signal, and periodically updates parameters of the filters (40/0, ..., 40/M) used for deriving each particular basis signal such that each user-specific output signal will exhibit a desired optimized concentration of energy of that user's received signal as received by the array antenna.

17 Claims, 7 Drawing Sheets

U.S. PATENT DOCUMENTS

| | | | |
|---|---|---|---|
| 6,795,392 B1 * | 9/2004 | Li et al. | 370/210 |
| 6,907,272 B2 * | 6/2005 | Roy | 455/562.1 |
| 6,934,323 B2 * | 8/2005 | Hara | 375/152 |
| 7,187,940 B2 * | 3/2007 | Kelley | 455/501 |
| 7,231,007 B2 * | 6/2007 | Artamo et al. | 375/347 |
| 2004/0146024 A1 * | 7/2004 | Li et al. | 370/334 |

FOREIGN PATENT DOCUMENTS

| | | |
|---|---|---|
| JP | 11-502896 | 3/1999 |
| JP | 2003-152603 | 5/2002 |
| JP | 2003-283394 | 10/2003 |
| JP | 2004-354377 | 12/2004 |
| JP | 2005-152435 | 4/2005 |
| JP | 2006-515471 | 5/2006 |
| JP | 2007-503767 | 2/2007 |

OTHER PUBLICATIONS

S. Verdu, Multiuser Detection. Cambridge: Cambridge University Press, 1998, pp. 154-213.

J. Salz, "Digital transmission over cross-coupled linear channels," AT&T Tech. J., vol. 64, No. 6, Jul.-Aug. 1985, pp. 1147-1159.

B. R. Petersen and D. D. Falconer, "Equalization in cyclostationary interference," Technical Report SCE-90-01, Dept. of Systems and Computer Engineering, Carleton University, Jan. 1990.

S. Roy and D. D. Falconer, "Modelling the narrowband base station correlated diversity channel," in Proc. CTMC'99, Vancouver, Canada, Jun. 1999.

C. Farsakh and J. A. Nossek, "Spatial covariance based downlink beamforming in an SDMA mobile radio system," IEEE Trans. Comm., vol. 46, No. 11, pp. 1497-1506, Nov. 1998.

D. Gerlach, Adaptive Transmitting Antenna Arrays at the Base Station in Mobile Radio Networks, PhD dissertation, Stanford University, Stanford, U. S., Aug. 1995.

G. H. Golub and C. F. Van Loan, Matrix Computations. Baltimore: Johns Hopkins University Press, 1989.

M. V. Clark, Diversity and Equalization in Digital Cellular Radio, PhD disseration, University of Canterbury, Christchurch, New Zealand, 1992.

* cited by examiner

MULTI-USER ADAPTIVE ARRAY RECEIVER AND METHOD

TECHNICAL FIELD

The invention relates to a receiver system comprising an antenna and a receiver, the antenna comprising an array of antenna elements. It also relates to the receiver per se and to a receiving method. The invention is especially, but not exclusively, applicable to array receivers and methods for use in base stations of digital cellular telecommunications networks or access points of wireless local area networks (LANs).

BACKGROUND ART

The invention is applicable in systems wherein multiple users simultaneously make use of a common carrier or use distinct carriers with some amount of overlap/crosstalk between them such as (i) carrier reuse-within-cell (RWC), also called Space-Division Multiple Access (SDMA) because of the need for an antenna array to spatially discriminate co-channel signals; (ii) Code-Division Multiple Access (CDMA) systems where multiple users transmit in the same band using distinct codes; and (iii) Time-Division Multiple Access (TDMA) and/or Frequency-Division Multiple Access (FDMA) systems where users are not perfectly separable in time and/or frequency, i.e. they interfere with one another either in time (e.g. because of dispersive channels) and/or in frequency (e.g. because of excess bandwidth due to imperfect channel filtering) thus leading to adjacent-channel interference (ACI).

Mathematical expressions in this patent specification are based upon complex baseband notation.

Array antenna radio receivers typically are employed at the base stations or access points of digital communications systems (e.g. mobile telephone networks, broadband wireless access for Internet and/or wide-area networking, etc.) to improve reception link quality (i.e provide robustness against multipath fading) and/or reduce interference levels, where interference can include thermal noise and man-made signals which exist in the desired signal's band. Since such systems typically accommodate large numbers of simultaneously active users in any given cell or sector, the base station receiver must be capable of maintaining a plurality of radio links.

Known antenna array radio receiver systems comprise an array of antenna elements coupled to a signal receiving section (also referred to as a radio-frequency (RF) front-end) which in turn is coupled to a signal processing section. The signal receiving section processes the branch signals from the different antenna elements independently, in separate branches, and performs on each branch signal standard down-conversion, demodulation, filtering to isolate the channel of interest and, possibly, some transformation on the signal to bring it to a form usable by the signal processing section (e.g. analog-to-digital conversion if the signal processor is digital). The signal processor takes the information from all of the branches (i.e. the demodulated, filtered and suitably transformed signal data from each individual antenna element) and, using one of a number of appropriate known techniques, combines and processes it to extract a useful signal $y(t)$, which is the best possible estimate of the desired user signal $s_0(t)$.

In the context of wireless communications, the received vector $x(t)$ (i.e. the received signal across all array elements) is made up of a desired signal $s_0(t)$ transmitted by a "desired user's" wireless terminal, interfering signals $s_m(t)$ transmitted by competing terminals which operate in the same frequency band or in adjacent bands with some amount of crosstalk being present, and white noise $n(t)$. Hence, in non-dispersive (i.e. narrowband) environments $$x(t) = c_0(t)s_0(t) + \sum_{m=1}^{M} c_m(t)s_m(t) + n(t), \quad (1)$$

where $c_m(t)$ is an N×1 vector of complex elements describing the channel from the mth terminal to all of the N array elements, M is the number of interfering signals, $n(t)$ is the white thermal noise vector, and $c_0(t)$ is an N×1 complex vector describing the channel from the 0th terminal which, by convention, is that of the desired user.

In such a context, the function of the antenna array radio receiver is to isolate the desired user signal $s_0(t)$ from the interferers and white noise as well as compensate for distortions introduced in the channel $c_0(t)$ (e.g. multipath fading) so that, at all times, the array output signal $y(t)$ approximates the desired user signal $s_0(t)$ as closely as possible.

Typically, the receiver combines the branch signals from the individual antenna elements simply by means of a linear weight-and-sum operation. If an N-element array is considered and $x(t)$ is the N×1 vector of the array element outputs, the array output is defined as $$y(t) = w^H(t)x(t), \quad (2)$$

where $w(t)$ is the N×1 complex weight vector and $(\cdot)^H$ denotes the Hermitian transpose (i.e. complex conjugate transpose of its argument, be it a vector (as it is in the above) or a matrix).

Although it is time-varying, the weight vector varies slowly compared to the input and output signals, since it tracks changes in the channels, not in the signals themselves. When a combiner operates according to equation (2), it is termed a linear combiner and the entire receiver is designated a linear array receiver.

Typically, the receiver collects statistics of the input signal $x(t)$ and uses them to derive a weight vector which minimizes some error measure between the array output $y(t)$ and the desired signal $s_0(t)$. One of the most common error measures in such applications (i.e. adaptive filtering) is the mean-square error $$\epsilon = <[y(t) - s_0(t)]^2> = <[w^H(t)x(t) - s_0(t)]^2>, \quad (3)$$

which forms an N-dimensional quadratic surface with respect to the weight vector elements. The minimization of this criterion forms the basis of minimum mean-square error (MMSE) linear array receivers (also called optimum combiners).

(Note: Henceforth, the dependence upon time t in equations will be omitted for the sake of clarity.)

Adaptive filtering theory indicates that the best combination of weights in the MMSE for a given sequence of received data is $$w = R_{xx}^{-1} c_0 \quad (4)$$

where $R_{xx}$ is the covariance matrix of the received array outputs and is given by $$R_{xx} = <xx^H>, \quad (5)$$

where $(\cdot)$ denotes the expectation (i.e. the ensemble average) of its argument.

Such array receivers are suitable for use where tine dispersion due to multipath propagation does not extend significantly beyond a single symbol period. That is, there is little or no intersymbol interference (ISI).

When the channels carrying useful signals do exhibit significant ISI, the traditional solution is to use an equalizer, which is an adaptive filter whose purpose is to invert the channel impulse response (thus untangling the ISI) so that the overall impulse response at its output will tend to be much shorter in time and have an ideal, flat (or equalized) frequency spectrum.

The signal processing portion of the standard linear equalizer works in the same way as a linear adaptive array receiver except that the signal sources, i.e., the elements of the input vector x, are not points in space (i.e. the array of antenna elements) but points in time. The signals are tapped at a series of points along a symbol-spaced delay line (termed a tapped-delay line or TDL), then weighted and combined.

While the implementation of the signal processing apparatus for both the equalizer and the array receiver can be identical (minimization of the MSE by adaptive weighting of the inputs), the performance will differ. Because signals are physically sampled at different points in space by the array receiver, it is very effective at nulling unwanted signal sources or co-channel interference (CCI). However, it has limited ability against intersymbol interference (ISI) due to dispersive, i.e. frequency-selective, fading, since the latter is spread in time. On the other hand, the equalizer is adept at combatting ISI but has limited ability against CCI.

In environments where both ISI and CCI are present, array reception and equalization may be combined to form a space-time array receiver. The most general form of the latter is obtained when each weighting multiplier in a narrow band array receiver is replaced by a full equalizer for a total of N equalizers. Again the implementation of the signal processing section will be similar and will rely on equation (2) supra. The only difference is that the weight vector w and the input vector x will each be longer. Indeed, for an equalizer length of L taps and an array size of N elements, the vectors w and x will both have LN elements.

The canonical linear mean-square-error minimizing space-time receiver (i.e. the most obvious and immediate linear space-time receiver structure and also in certain respects the most complex) comprises an antenna array where each array element output is piped to a finite impulse response (FIR) adaptive filter, which in this context is referred to as an equalizer. Each adaptive filter comprises a tapped-delay line where taps are spaced by a symbol period or a fraction of a symbol period. For good performance, the length of the tapped-delay line should be equal or superior to the average channel memory length. In many cases, the number of taps this implies can be very large (e.g. 10-100 per adaptive filter).

The weights multiplying each tap output must be constantly adapted to follow the changes in the channel(s) characteristics. This can be performed in various ways, either with continuous or block-based adaptation and with or without the support of known training symbols. In most known systems, the weights are computed on a block-by-block basis (block adaptation) and each block contains a sequence of known training symbols for that purpose. In digital wireless communications, the block used for adaptation purposes will typically correspond to a data packet as defined by the networking protocol in use. Moreover, the channels can be considered static over the length of a block (i.e., the length of a block is significantly smaller than the channel correlation time).

By adapting the weights to minimize a global performance index, e.g. the mean-square error between the desired signal and the S-T receiver output, the receiver usually performs the following:

reduces or eliminates intersymbol interference (ISI) caused by frequency-selective fading in wideband channels;

reduces or eliminates co-channel interference (CCI) from nearest cells where carriers are reused or from inside the cell (since the space-time processor permits reuse of carriers within cell—or sector—thanks to its power of spatial discrimination—often referred to as space division multiple-access (SDMA));

improves output SNR (due to the array's larger effective aperture).

Since wireless systems are typically interference-limited (i.e., interference is the main impediment which prevents capacity increase—accommodating more active users—above a certain limit), the first two benefits of space-time processors are mainly of interest in order to increase capacity.

To achieve maximal benefit, it is better to combine the S-T array with carrier reuse-within-cell (RWC). A number of previous patents disclose arrays (see, for example U.S. Pat. Nos. 5,515,378 and 5,592,490) or space-time systems (see, for example, U.S. Pat. No. 5,828,658) applied in an SDMA (i.e. RWC) context. In such a system, separate S-T processors will have to be implemented for every user (all processors share the same physical antenna array and front-end receiver circuitry but have distinct equalizers and combiners). However, the base station has information (received symbols, channel characteristics) available about in-cell interferers since each in-cell interferer is another local S-T processor's desired signal.

S-T processor architectures can be formulated to exploit this multiuser information by establishing some type of connectivity between individual S-T processors to achieve one of two goals:

improve performance (reduced bit-error rate, improved interference nulling, etc.);

reduce complexity and cost.

It is known to exploit multiuser information to perform "joint detection" of many users, for example by constructing a global multiuser MSE criterion, thus improving performance of an array receiver (with respect to single user detection) at the cost of increased complexity [2], [3].

It is also known that, with appropriate space-time processing, it is possible to combine SDMA with adequate temporal processing to mitigate the intersymbol interference (ISI) present in wideband dispersive channels [6].

One of the main disadvantages of previously-known space-time processing receivers is their great complexity and cost, especially if multiuser detection is employed and/or temporal processing employed.

It is known to reduce bandwidth requirements in forward-channel probing transmitters by tracking only long-term variations in the channels (i.e., the subspace structure) [11] but that approach is not applicable in receivers without seriously limiting user capacity.

DISCLOSURE OF INVENTION

The present invention seeks to at least mitigate the disadvantages of such known array receiver systems and to this end provides a multiuser space-time array receiver, and system incorporating same, exploiting multiuser information in order to reduce complexity and cost.

According to one aspect of the present invention, there is provided an array receiver for processing signals received from a plurality (M+1) of co-channel transmitting users via an array antenna having an array of (N) antenna elements to obtain a set of user-specific estimated received signals ($z_0, \ldots, z_M$) each corresponding to a respective one of said transmitting users, said array receiver having:

radio frequency units ($26/1, \ldots, 26/N$) for conversion of signals from the array antenna to provide a corresponding set of (N) antenna element signals ($x_1, x_2, \ldots, x_N$), respectively, where N is at least equal to the number (M+1) of transmitting users, each of the antenna element signals ($x_1, x_2, \ldots, x_N$) comprising information from each of the plurality (M+1) of transmitting users, a common preprocessing section (40) for receiving and processing the (N) antenna element signals ($x_1, x_2, \ldots, x_N$) from the radio frequency units ($26/1 \ldots 26/M$) to provide a plurality (M+1) of basis signals ($y_0, \ldots, y_M$), and a plurality (M+1) of signal processing units ($60_0, \ldots, 60_M$) each for processing said basis signals ($y_0, \ldots, y_M$) to provide a respective one of said user-specific estimated received signals ($z_0, \ldots, z_M$), wherein the common preprocessing section (40) comprises filtering means ($40/1, \ldots, 40/M$) for sampling each of the (N) antenna element signals ($x_1, x_2, \ldots, x_N$) and combining resulting samples of at least some of said antenna element signals ($x_1, x_2, \ldots, x_N$) to provide said plurality of (M+1) basis signals ($y_0 \ldots, y_m$), each of the basis signals ($y_0, \ldots, y_M$) comprising a different combination of the antenna element signals ($x_1, x_2, \ldots, x_N$) and having $\mu$ dimensions spanning a dominant subspace containing most of the energy from a respective one of the transmitted user signals, said (M+1) basis signals ($y_0, \ldots, y_M$) together having fewer space-time dimensions ($\mu \times (M+1)$) than the space-time dimensions ($N \times L$) of the (N) combined antenna element signals ($x_1, x_2, \ldots, x_N$), where L is the maximum length of the channel impulse response in symbol periods, and updating means for periodically updating parameters of the filtering means ($40/1, \ldots, 40/M$) used for deriving each particular basis signal such that each of the user-specific estimated received signals ($z_0, z_1, \ldots z_M$) will exhibit a desired optimized concentration of energy;

and wherein each of said signal processing units ($60_0, \ldots, 60_M$) has a plurality of inputs coupled to the common preprocessing section (40) for receiving therefrom all of the (M+1) basis signals ($y_0, \ldots, y_M$), and is adapted for processing and combining at least some of said (M+1) basis signals ($y_0, \ldots, y_M$) to produce a respective one of said set of user-specific estimated received signals ($z_o, \ldots, z_M$) for a corresponding desired one of the plurality (M+1) of transmitting users.

In preferred embodiments, the updating means comprises means for adjusting said parameters in dependence upon channel characteristics of all user channels. Each of the processor units then may comprise means for weighting the basis signals before combining same, the weights being adjusted in dependence upon channel characteristics of all user channels, wherein the parameters of the filtering means are updated less frequently than the weights of the processors.

The number of basis signals may be equal to the number of desired users.

The updating means may comprise a training sequence generator for generating a training sequence for the corresponding user, covariance matrix estimation means responsive to the training sequence and the antenna signals for providing a covariance matrix embodying long-term statistics for the channel of that user, and eigenvector estimation means for extracting from said covariance matrix at least the dominant eigenvector, elements of said dominant eigenvector being applied to said filtering means as weights for updating said parameters.

Preferred embodiments of the first aspect of the present invention address the complexity issue by (1) creating, from the antenna element outputs, a common basis of filters (i.e. filter bank) useful for all users' processors, (2) adapting this basis based on the slowly-varying statistical channel structure, thus reducing the computational burden, and (3) by selecting for each user only a few (e.g. 2 or 3) most significant filter outputs from the common basis for rapid adaptation.

Preferably, when the array receiver system is employed in a space-division multiple access (SDMA) communications system, the plurality of basis filters in the preprocessing unit and the plurality of subsequent receiver signal processing units are both assigned to an ensemble of transmitting users sharing a common channel (i.e. frequency band) at the same time.

Alternatively, the plurality of basis filters and subsequent receiver sections could be assigned to an ensemble of transmitting antennas belonging to the same user, yet transmitting different bit sequences in order to provide a higher aggregate bit rate. This latter configuration corresponds to a multi-input (MIMO) link. It should be understood that, in the following, references to a "user" in a SDMA context would translate to "transmitting antenna" in a MIMO context and that the techniques described in a SDMA context otherwise are directly applicable in a MIMO context.

According to a second aspect of the present invention, there is provided an array receiver system comprising an array antenna having a plurality (N) of antenna elements in combination with an array receiver for processing signals received from a plurality (M+1) of co-channel transmitting users via said array antenna to obtain a set of user-specific estimated received signals ($z_0, \ldots, z_M$) each corresponding to a respective one of said transmitting users, wherein said array receiver has:

radio frequency units ($26/1, \ldots, 26/N$) for conversion of signals from the array antenna to provide a corresponding set of (N) antenna element signals ($x_1, x_2, \ldots, x_N$), respectively, where N is at least equal to the number (M+1) of transmitting users, each of the antenna element signals ($x_1, x_2, \ldots, x_N$) comprising information from each of the plurality (M+1) of transmitting users, a common preprocessing section (40) for receiving and processing the (N) antenna element signals ($x_1, x_2, \ldots, x_N$) from the radio frequency units ($26/1 \ldots 26/M$) to provide a plurality (M+1) of basis signals ($y_0, \ldots, y_M$), and a plurality (M+1) of signal processing units ($60_0, \ldots, 60_M$) each for processing said basis signals ($y_0, \ldots, y_M$) to provide a respective one of said user-specific estimated received signals ($z_0, \ldots, z_M$), wherein the common preprocessing section (40) comprises filtering means ($40/1, \ldots, 40/M$) for sampling each of the (N) antenna element signals ($x_1, x_2, \ldots, x$) and combining resulting samples of at least some of said antenna element signals ($x_1, x_2, \ldots, x_N$) to provide said plurality of (M+1) basis signals ($y_0 \ldots, y_M$), each of the basis signals ($y_0, \ldots, y_M$) comprising a different combination of the antenna element signals ($x_1, x_2, \ldots, x_N$) and having $\mu$ dimensions spanning a dominant subspace containing most of the energy from a respective one of the transmitted user signals, said (M+1) basis signals ($y_0, \ldots, y_M$) together having fewer space-time dimensions ($\mu \times (M+1)$) than the space-time dimensions ($N \times L$) of the (N) combined antenna element signals ($x_1$, $x_2, \ldots, x_N$), where L is the length of the channel impulse response in symbol periods,
and
updating means for periodically updating parameters of the filtering means (40/1, ..., 40/M) used for deriving each particular basis signal such that each of the user-specific estimated received signals ($z_0, \ldots, z_M$) will exhibit a desired optimized concentration of energy;
and wherein each of said signal processing units (60$_0$, ..., 60$_M$) has
a plurality of inputs coupled to the common preprocessing section (40) for receiving therefrom all of the (M+1) basis signals ($y_0, \ldots, y_M$), and is
adapted for processing and combining at least some of said (M+1) basis signals ($y_0, \ldots, y_M$) to produce a respective one of said set of user-specific estimated received signals ($z_0, \ldots, z_M$) for a corresponding desired one of the plurality (M+1) of transmitting users.

Preferably, in embodiments of either aspect, when the array receiver is employed in a code-division multiple access (CDMA) communications system, the plurality of basis filters forming the common basis and the plurality of subsequent receiver signal processing units are both matched to:
(1) an ensemble of users sharing the same spreading code, if code re-use is employed in the said communications system, or;
(2) an ensemble of users with different codes, in which case the array receiver system can further separate the users' signals and possibly compensate discrimination problems due to code correlation, power capture, etc.

In a CDMA system, the usual despreading can be performed at the outputs of the basis filters. Alternatively, the spreading operation at the transmitter can be considered a part of the radio channel, in which case it is natural to despread in the basis filters.

The array receiver of either aspect could also be employed at the base station of a time-division multiple access (TDMA) communications system or a frequency-division multiple access (FDMA) communications system which does not employ carrier re-use. In such a case, the plurality of dominant basis filters of the common preprocessing unit and the plurality of subsequent receiver signal processing units are both matched to an ensemble of users which are not perfectly separable in time and/or frequency, i.e. they interfere with one another either in time (e.g. because of dispersive channels) and/or in frequency (e.g. because of excess bandwidth due to imperfect channel filtering) thus leading to adjacent-channel interference (ACI).

Other aspects of the invention include an array receiver system comprising a receiver according to the first or second aspect, in combination with a said array antenna, and the corresponding method of operating the array receiver.

Thus, according to a third aspect of the present invention, there is provided a method of receiving signals from a plurality (M+1) of co-channel transmitting users via an array antenna having an array of (N) antenna elements providing a set of antenna element signals ($x_1, x_2, \ldots, x_N$), respectively, to obtain a set of user-specific estimated received signals ($z_0, \ldots, z_M$) each corresponding to a respective one of said transmitting users, the method comprising the steps of:
using radio frequency units (26/1, ..., 26/N), converting signals from the array antenna to provide a corresponding set of (N) antenna element signals ($x_1, x_2, \ldots, x_N$), respectively, where N is at least equal to the number (M+1) of transmitting users, each of the antenna element signals ($x_1, x_2, \ldots, x_N$) comprising information from each of the plurality (M+1) of transmitting users, using a common preprocessing section (40), receiving and processing the (N) antenna element signals ($x_1, x_2, \ldots, x_N$) from the radio frequency units (26/1 ... 26/M) to provide a plurality (M+1) of basis signals ($y_0, \ldots, y_M$), and
using a plurality (M+1) of signal processing units (60$_0$, ..., 60$_M$), processing said basis signals ($y_0, \ldots, y_M$) to provide said user-specific estimated received signals ($z_0, \ldots, z_M$),
wherein the receiving and processing step comprises the steps of
using filtering means (40/0, ..., 40/M), sampling each of the (N) antenna element signals ($x_1, x_2, \ldots, x_N$) and combining resulting samples of at least some of said antenna element signals ($x_1, x_2, \ldots, x_N$) to provide said plurality of (M+1) basis signals ($y_0, \ldots, y_M$), each of the basis signals ($y_0, \ldots, y_M$) comprising a different combination of the antenna element signals ($x_1, x_2, \ldots, x_N$) and having μ dimensions spanning a dominant subspace containing most of the energy from a respective one of the transmitted user signals, said (M+1) basis signals ($y_0, \ldots, y_M$) together having fewer space-time dimensions (μx(M+1)) than the space-time dimensions (N×L) of the (N) combined antenna element signals ($x_1, x_2, \ldots, x_N$), where L is the length of the channel impulse response in symbol periods,
and
periodically updating parameters of the filtering means (40/0, ..., 40/M) used for deriving each particular basis signal such that each of the user-specific estimated received signals ($z_0, z_1, \ldots, z_m$) will exhibit a desired optimized concentration of energy;
and wherein the step of processing the basis signals ($y_0, \ldots, y_M$) comprises the steps of
receiving from the common preprocessing section (40) all of the (M+1) basis signals ($y_0, \ldots, y_M$), and
processing and combining at least some of said (M+1) basis signals ($y_0, \ldots, y_M$) to produce each of said set of user-specific estimated received signals ($z_0, \ldots, z_M$) for a corresponding desired one of the plurality (M+1) of transmitting users.

In one preferred embodiment, the receiver:
(1) maintains, through periodic updates, a set of dominant basis filters, each of which is matched to one desired user among the users of interest, and the outputs of which are processed by the subsequent receiver sections and combined in order to yield an estimate of the desired signal for each desired user;
(2) periodically estimates and/or updates the component weights of the dominant subspace filters by correlation, with a known training sequence or with the user's spreading code in a CDMA system or with any other signal strongly correlated with the user of interest's signal, in combination with appropriate temporal averaging to isolate subspace-level information, as opposed to instantaneous channel characteristics;
(3) periodically or dynamically estimates and/or updating the component weights (and/or any other parameters of interest) of the receiver sections fed from the prefiltering section in a manner and at a rate such that instantaneous channel changes are tracked to provide a reliable and consistent estimate of the desired signal.

In embodiments of any of the first, second and third aspects of the invention, the receiver may comprise a series of standard linear MMSE space-time processors (i.e. one possible embodiment of the receiver sections), one for each of the M+1 signals, operating on the transformed input vector y[n]. However, this method only results in a net reduction of numerical effort if the number of signals M+1 taken into account is significantly lower than the number of antenna elements N (in which case the dimensionality of the input vector is reduced from N to M+1).

Embodiments of any of the three aspects of the invention may include space-time matched filtering. This provides a much greater potential complexity reduction and makes the invention more widely applicable. Thus, to further decrease computational cost, a logical extrapolation of the above concept is to extend the eigenfiltering to the temporal—as well as the spatial—domain. In this case, only M+1 taps are left to be actively adapted (at every packet) for each user (as opposed to NL taps for a conventional system where N is the number of elements and L is the required adaptive filter length, i.e., the maximum number of symbol periods or filter taps. To achieve acceptable performance, it is normally required that M≧N; therefore this system will reduce the number of actively adapted taps by at least a factor of L.)

It so happens that a large portion of the ISI will in most cases be handled by the eigenfiltering, Indeed, the angle spread of an impinging signal at the base station is typically narrow due to the height of the base, i.e. most scattering activity then occurs in the immediate vicinity of the subscriber. This has the effect of making the covariance matrix of the signal under consideration heavily biased towards the first few eigenvalues [11]. A bank of primary eigenfilters eliminates the ISI associated with the first eigenvalue. Furthermore, it has been shown that a memoryless combiner (such as those that follow the eigenfilter bank) has some ability to reduce ISI [13].

In cases where these two ISI reduction steps are not enough to warrant satisfactory performance, more dimensions can be added to the dominant subspace space-time filters to eliminate the ISI and CCI associated with the secondary and subsequent eigenmodes at the cost of increased complexity, since more taps will have to be actively adapted in the receiver sections.

According to another embodiment of the invention, the receiver preprocessing sections can include adaptive equalization, thus reducing the need in certain cases for a large number of subspace dimensions to adequately handle the ISI.

The foregoing and other objects, features, aspects and advantages of the present invention will become more apparent from the following detailed description, taken in conjunction with the accompanying drawings, of preferred embodiments of the invention, which are described by way of example only.

DETAILED DESCRIPTION OF PREFERRED EMBODIMENTS

To facilitate understanding of the construction and operation of the preferred embodiments, some basic theory will first be presented.

As discussed, the optimal MMSE solution can be obtained through a linear combination of all signals' matched-filters [7], [8]. Given an antenna array and a dispersive (i.e. ISI-inducing) propagation environment, it follows that the optimal MMSE solution can be obtained as a linear combination of all signals' space-time matched-filters. Here, a space-time filter matched to a given signal is a bank of N temporal filters, each of which processes one of the N antenna elements' outputs, and whose outputs are combined to maximize the said signal's power with respect to white noise and disregarding interference from the other man-made signals.

This is advantageous in a multi-user SDMA context since the set of matched filters form a common basis which can be reused to obtain each signal's MMSE solution. In standard optimal architectures, independent combiners (sets of weights) must be maintained for each user and they must typically be recomputed from scratch at the start of a new packet because of the changing interference patterns. If a way can be found to maintain with low computational cost a matched filter for every active connection, computing an MMSE solution for a given user and packet becomes simply a matter of selecting the appropriate matched filters (corresponding to the active interferers in the packet of interest) and using their outputs as inputs to standard MMSE processors (one per desired user) which are adapted using the training sequence prefixes. The complexity of this approach is appealing when the system is designed in such a way that the number of inputs to the standard MMSE processors is substantially reduced with respect to a system in which the antenna elements' outputs are directly processed.

One method to approximate the behaviour of a matched-filter without having to track the multipath fading is to identify dominant subspaces of the users' vector channels. The said subspaces will contain most of the useful information yet vary at a much slower rate than the channels themselves. A dominant subspace is the reduced-rank space spanned by the few most significant dimensions of the long-term eigenstructure of the channel of interest. One case of interest (because it minimizes complexity) consists in dominant subspaces with a single dimension. When the corresponding eigenvector is used as a filter, the resulting device is termed an eigenfilter.

To obtain better estimates of the desired signals, it may be necessary to perform eigenfiltering with subspaces having more than one dimension. The required number μ of dimensions for a given level of performance is a function of the propagation environment. Eigenfiltering over multidimensional subspaces is termed hereafter dominant subspace filtering.

Figure 1:
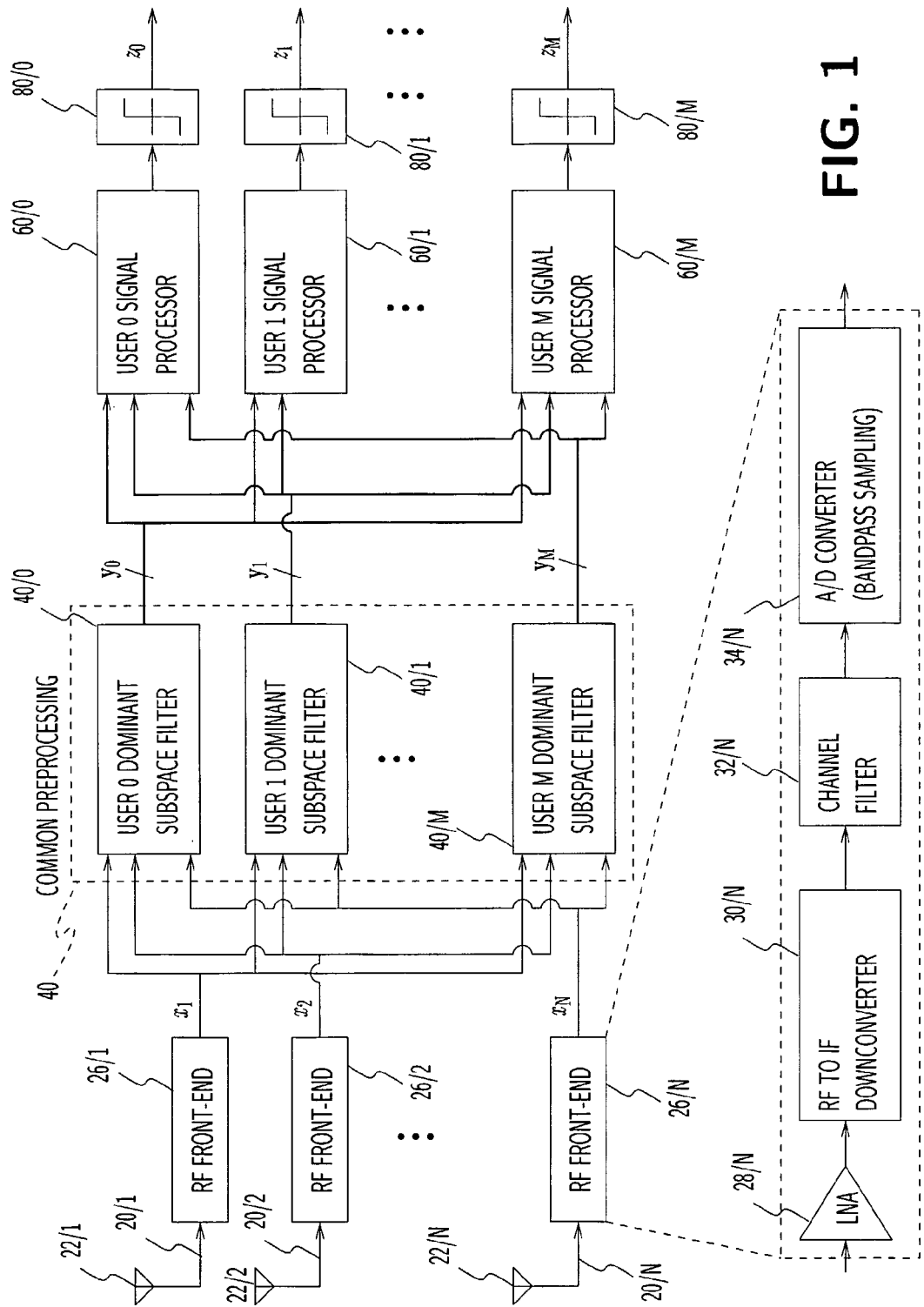
FIG. 1 is a simplified block schematic diagram of an array receiver system having a receiver and an array antenna comprising an array of antenna elements.

Referring to FIG. 1, an array antenna receiver system for receiving signals from a plurality of user transmitters (not shown) comprises an array antenna having a plurality of antenna elements, specifically N elements 22/1, ..., 22/N, each coupled to a respective one of a corresponding plurality of RF front-end processing units 26/1, ..., 26/N of an RF receiver section 26, which units treat the signals from the antenna elements to produce N antenna signals $x_1, \ldots, x_N$, respectively. Each of the RF front-end units 26/1, ..., 26/N has its output coupled to the input of each of a set of M+1 filters, specifically subspace filters, 40/0, . . . , 40/M, of a common preprocessing section 40. Each of the subspace filters 40/0, . . . , 40/M is matched to a respective one of an ensemble of M+1 transmitting users, and has its output coupled to the input of each of a corresponding plurality of user-specific signal processors 60/0, . . . , 60/M of a signal processing section 60. Each of the signal processors 60/0, . . . , 60/M processes the respective set of the basis, specifically subspace, signals $y_0, \ldots, y_M$ of the subspace filters 40/0, . . . , 40/M, respectively, to produce a corresponding one of a plurality of estimates $z_0, \ldots, z_M$ of the signals $s_0, \ldots, s_M$ transmitted by the M+1 users.

The RF "front-end" units 26/1, . . . , 26/N are identical and of conventional construction, so only one will be described, with reference to the inset diagram of FIG. 1. As shown inset in FIG. 1, RF front-end unit 26/N comprises a low-noise amplifier (LNA) 28/N, a RF to IF downconverter 30/N, a channel filter 32/N (which isolates the required channel and rejects out-of-band noise and interference), and an analog-to-digital converter 34/N for performing bandpass sampling. Alternatively, the IF or RF signal could be down converted to baseband prior to analog-digital conversion. The various alternatives and compromises possible here are known to practitioners of the art. The output of the A/D converter unit 34/N is also the output of the RF front-end unit 26/N and is coupled to the input of each of the dominant subspace filters 40/0, . . . , 40/M.

In each of the following embodiments, all of the dominant subspace filters 40/0, . . . , 40/M are identical; although their structure differs from one embodiment to another.

In the embodiment of FIG. 1, the dominant subspace filters 40/0, . . . , 40/M are principal space-time eigenfilters. Since they are all identical, only the generic structure of the filter for a user m will now be described, with reference to FIG. 2.

Although the performance analysis will be presented in the frequency domain, the actual implementation can be made in the time domain. The eigenfilters then take the form of banks of N tapped-delay lines $50/m_1, \ldots 50/m_N$ each with a series of one-symbol delays, the number L of such delays being chosen to give a delay line length according to the typical memory length of channels in the band of operation. In each tapped delay line, a series of multipliers extract the delayed signals from respective taps of the delay line and multiply each of them by a respective complex weight. For example, in delay line $50m_1$, having individual delays $52m_{11}, \ldots 52m_{1L}$, a series of multipliers $54m_{11}, \ldots 54m_{1L}$ multiply the tapped signals by complex weights $w_{11}, \ldots, w_{1L}$, respectively, while, in delay line $50m_N$ having individual delays $52m_{N1}, \ldots 52m_{NL}$, a series of multipliers $54m_{N1}, \ldots 54m_{NL}$ multiply the tapped signals by complex weights $w_{N1}, \ldots w_{NL}$, respectively. The other tapped delay lines are similar.

The outputs of the delay lines $50/m_1, \ldots, 50/m_N$, i.e., the signals from the multipliers $54m_{1L}, \ldots, 54m_{NL}$, respectively, are combined by a summer 52/m to form $y_{m,1}$, the primary eigenfilter output for user m. It should be noted that there can be any number of such eigenfilters whose combined outputs will make up the dominant subspace filter output i.e. subspace signal $y_m$. Thus, $y_m = [y_{m,1} \ldots y_{m,\mu}]$ where μ is the number of eigenfilters defining the dimensions of the dominant subspace for user m. This estimate $y_m$ is supplied to all of the signal processors 60/0, . . . , 60/M (FIG. 1).

The weights are dynamically adapted according to second-order statistics as will now be described. A training sequence generator 42/m generates a replica of user m's known training sequence in synchronism with reception of said training sequence as part of a received packet. The output $s_m[k]$ of the training sequence generator 42/m is used by a covariance matrix estimator 44/m to estimate user m's current channel covariance matrix $R_1$ across all space-time tap positions. This is then used to update a running estimate of user m's long-term covariance matrix $\Sigma_m$. An eigenvector estimator 46/m then uses the estimate of $\Sigma_m$ as a basis to estimate its principal eigenvector. The individual components of said eigenvector constitute the current complex weights $w_{11}, \ldots, w_{1L}, \ldots w_{NL}$ which are supplied to multipliers $54_{11}, 54_{1L}, \ldots 54_{NL}$ in filter bank 48/m for use in subsequent processing of the received signals.

The adaptation procedure used by the eigenfilters $50/m_1, \ldots 50/m_N$ will now be described in detail with respect to the flowchart in FIG. 3, where the joint operation of a bank of 8 eigenfilters (corresponding to 8 transmitting users) is detailed.

Adaptation of the eigenfilters requires that a running estimate of each signal's long-term covariance matrix be maintained. This estimate could be updated every time a packet containing known training symbols is received from the user of interest. Since the long-term statistics change relatively slowly, however, the estimate update frequency for a given user is going to be much lower than the frequency of occurrence of the training sequence (which typically is provided in every packet from the user of interest).

In step 3.1, the dominant subspace filter 40/m waits for the current estimation interval to elapse (where "estimation interval" refers to the relatively long interval for long-term estimation as discussed above) and, in step 3.2, waits for the start of the next time slot. Assuming that the known training sequence is a prefix and is thus at the start of said time slot, in step 3.3 the portion of the received signal corresponding to the training prefix is stored in a buffer for further processing.

Given that $\check{c}_m$ is the "delay-extended" NL×1 vector representing the space-time signature of user m over all eigenfilter taps, i.e.

$$\check{c}_m = <c_m^H[1], c_m^H[2], \ldots, c_m^H[L]>, \quad (6)$$

where $\check{c}_m[n] = \check{c}_m(nT)$ is a sample of the vector impulse response of user m's channel at the array input taken at delay nT (nth multiple of the symbol period), in step 3.4, the dominant subspace filter 40/m obtains an estimated $\hat{c}_0$ of $\check{c}_0$ the vector impulse response for user 0 according to $$\hat{c}_0 = \sum_{k=1}^{K} \check{x}[n+1, k] s_0[k], \quad (7)$$

where $s_0[k]$ is user 0's training sequence (obtained from the training sequence generator 42/0 which is K symbols long and $\check{x}[k,n]$ is the space-time received signal vector over all eigenfilter taps corresponding to the kth training symbol of the nth training sequence. For example, for a fixed estimation interval of $T_c$ seconds and a symbol period of T seconds, $$\check{x}[n,k] = \check{x}(nT_c + kT). \quad (8)$$

In step 3.4, the eigenfilter covariance matrix estimator 44/m computes an estimate of the covariance matrix for user 0 for the current interval according to $$\hat{R}_0[n] = \frac{1}{K} \hat{c}_0[n] \hat{c}_0[n]^H. \quad (9)$$

By definition, the long-term delay-extended covariance matrix for signal ($s_m$) is $$\check{\Sigma}_m = \langle \check{c}_m \check{c}_m^H \rangle. \tag{10}$$

Accordingly, a running estimate of $\check{\Sigma}_0$ (for user 0) is updated in step 3.5. The estimator 44/$m$ obtains a running estimate of $\check{\Sigma}_m$ according to the following recursive relation:

$$\hat{\Sigma}_m[n] = \gamma \hat{\Sigma}_m[n-1] + (\gamma-1)\hat{R}_m[n], \tag{11}$$

where $\hat{\Sigma}_m[n]$ is the NL×NL long-term covariance matrix estimate after processing of the nth received training sequence for the signal from user m, $s_m[k]$ is the kth symbol in user m's training sequence and $\gamma$ is a forgetting factor chosen as a function of training update frequency and the rate of change of the long-term covariance matrix in the propagation environment of interest. It is likely that $\gamma$ would take on a value between 0.8 and 1 in most systems.

The covariance matrix estimator 44/$m$ supplies the estimate $\hat{\Sigma}_0$ to eigenvector estimator 46/$m$ which uses it in step 3.6 to estimate the principal eigenvector, thereby completing the weight estimation/update procedure for filter bank 48/0.

In this embodiment, the estimation of the principal eigenvector is performed using the iterative power method [12]. This requires an initial estimate of the eigenvector and an estimate of the covariance matrix (obtained in steps 3.5, 3.10, ..., 3.14). Based on these estimates, the dominant eigenvector of $\hat{\Sigma}_m$ can be obtained according to:

$$\hat{u}_m^{(I)}[n] = \hat{\Sigma}_m[n]\check{u}_m^{(I-1)}[n], \tag{12}$$

where $\hat{u}_m^{(I)}[n]$ is the estimate in the nth estimation interval of the dominant eigenvector over all NL S-T eigenfilter taps after the ith iteration of the power method (including normalization, i.e. $|\hat{u}_m^{(I)}[n]|^2 = 1$). The convergence rate of the power method depends on the ratio $|\lambda_2|/|\lambda_1|$ where $\lambda_1$ and $\lambda_2$ are the largest and second largest eigenvalues of $\hat{\Sigma}_m[n]$. For a well-conditioned matrix and any arbitrary starting vector $\check{u}_m^{(0)}[n]$, convergence will normally occur within 10 iterations.

Upon network entry of a new user, a large number of iterations (50-100) night be necessary to guarantee a good estimate of the dominant eigenvector regardless of the eigenvalue distribution. Afterwards, however, since the successive covariance matrix estimates $\Sigma_m[n]$ vary little from one to the next, only a few (perhaps even 1 or 2) iterations of the power method will be required between covariance matrix updates.

Figure 4:
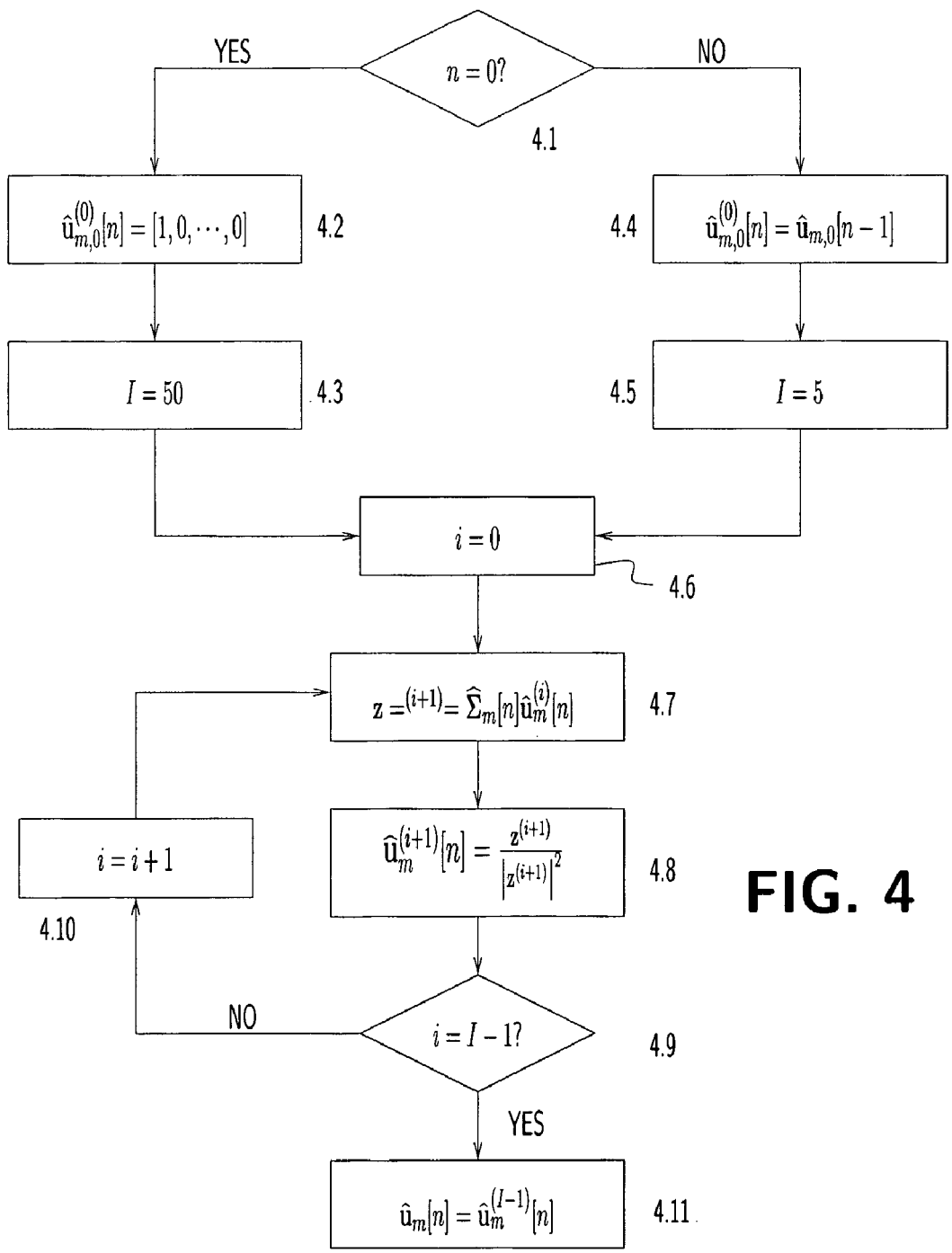
FIG. 4 is a flowchart depicting computation of principal eigenvector estimates for use in updating the weights.

The eigenvector estimation procedure (performed by the eigenvector estimators 46/0, ..., 46/7) will now be described with reference to the flowchart in FIG. 4 for user m.

In step 4.1, the estimator 46/$m$ compares estimation interval index n with 0; if n=0, then the first estimation is being performed since the group of users of interest has entered the network. Therefore, there is no previous estimate of the user m's principal eigenvector $\hat{u}_{m,0}[n]$ and an arbitrary estimate is used in step 4.2 to set the initial starting point $\hat{u}_{m,0}^{(0)}[n]$. In step 4.3, the number of iterations I is set relatively high (50) since the starting point is not necessarily close to the real eigenvector.

If n>0 in step 4.1, then, in step 4.4, the estimator 46/$m$ sets the starting point $\hat{u}_{m,0}^{(0)}[n]$ to the eigenvector estimate $\hat{u}_{m,0}[n-1]$ obtained in the previous estimation interval. In step 4.5, it sets the number of iterations I to 5.

In step 4.6, the estimator sets the iteration index I to 0 and then, in step 4.7, performs a first iteration of the power method according to $$z^{(I+1)} = \hat{\Sigma}_m[n]\hat{u}_m^{(I)}[n]. \tag{13}$$

In step 4.8, the estimator normalizes vector $z^{(I+1)}$ to unity to yield a refined estimate $\hat{u}_m^{(I+1)}[n]$. In step 4.9, the estimator verifies whether the prescribed number of iterations has been performed. If not, in step 4.10, it increments the iteration index I and repeats steps 4.7 to 4.10 as indicated by the loop back to step 4.7. This process repeats itself until I=I−1. Finally, the final product of the iterative process $\hat{u}_m^{(I-1)}[n]$ is assigned as the current principal eigenvector estimate $\hat{u}_m[n]$.

Figure 2:
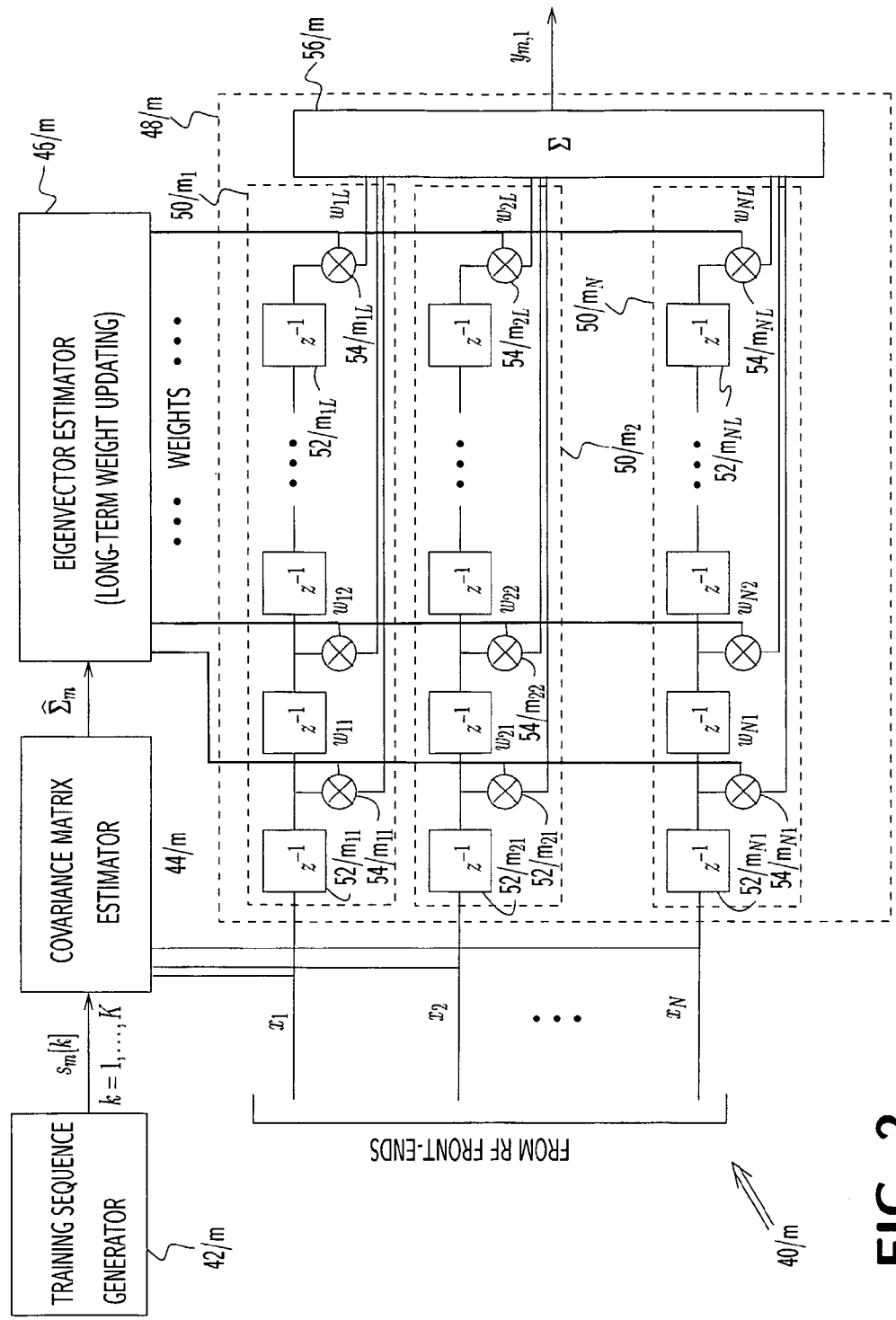
FIG. 2 is a more-detailed block schematic diagram of a part of the receiver showing, in more detail, a dominant subspace filter for one user.

Every time a new update of the dominant eigenvector is obtained, its components are immediately transferred into the weight registers of the eigenfilter banks 50/$m_1$, ..., 50/$m_N$ (FIG. 2).

The same procedure is repeated in steps 5.8 through 5.14 for users 1 to 7, i.e. filter banks 48/1 through 48/7.

Figure 3:
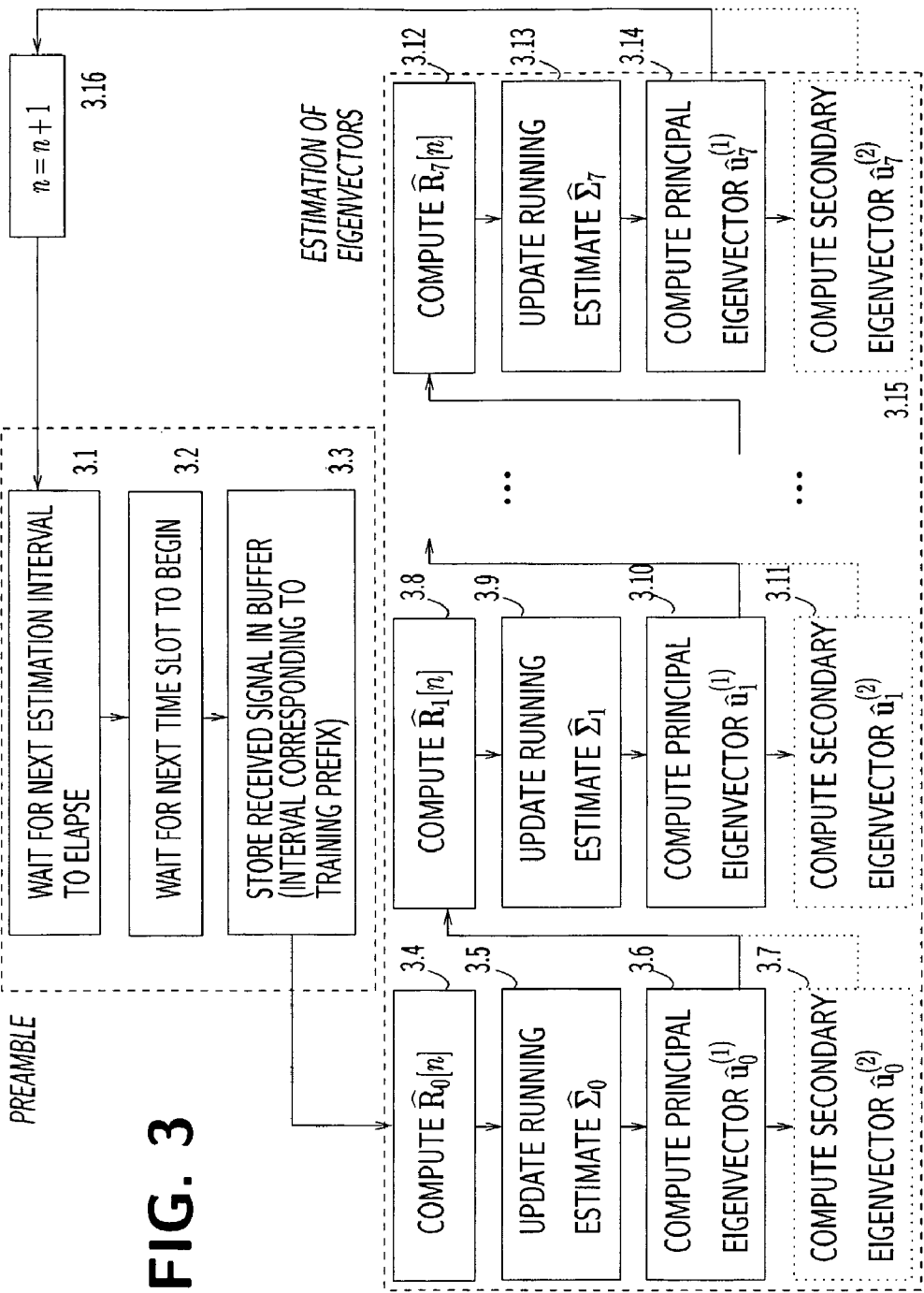
FIG. 3 is a flowchart depicting computation of updated weights for the dominant subspace filter.

In an alternative embodiment, corresponding to that shown in FIG. 3 but with the addition of the items shown as dotted lines and boxes, secondary eigenvectors are also computed in steps 3.7, 3.11, ..., 3.15, adding a second output to all dominant subspace filters 40/0, ..., 40/M and thus providing more flexibility to the subsequent signal processors 60/0, ..., 60/M. This can provide better performance against intersymbol interference (ISI) and against co-channel interference (CCI) and/or lessen the requirement for temporal processing in processors 60/0, ..., 60/M, as explained below. In fact, any desired number R of eigenvectors can thus be computed to achieve the desired cost/performance compromise and/or the desired complexity balance between the common preprocessing section 40 and the per-user processors 60/0, ..., 60/M.

Estimation of secondary and further eigenvectors must be performed in order of decreasing eigenvector importance. After estimating the principal eigenvector according to FIG. 4, the estimator subtracts its contribution from the covariance matrix $\hat{\Sigma}_m[n]$. The resulting covariance matrix, designated $A_2$, has a principal eigenvector which is approximately equal to the secondary eigenvector of $\hat{\Sigma}_m[n]$; the latter can therefore be estimated by following the procedure described with reference to FIG. 4.

Figure 5:
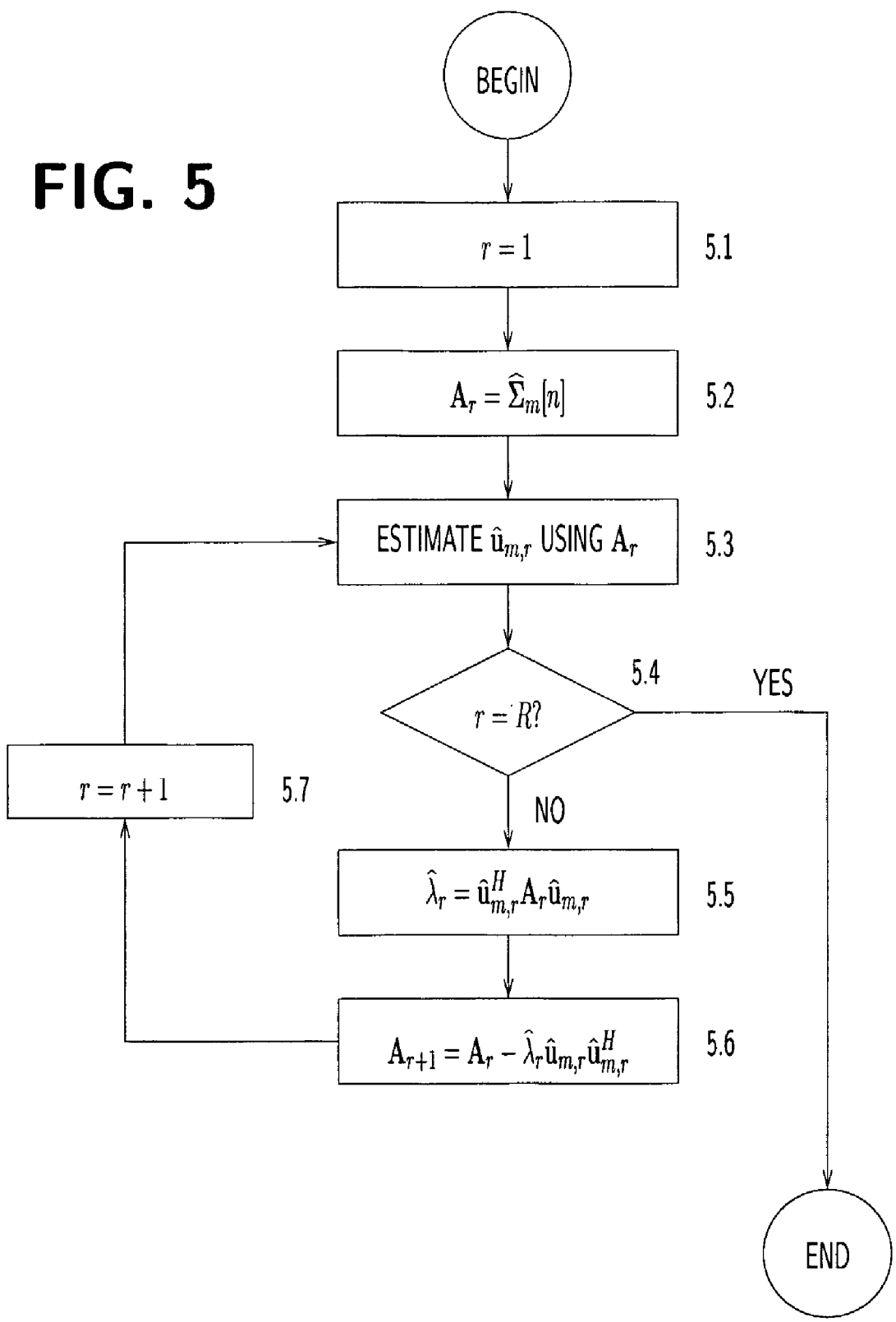
FIG. 5 is a flowchart depicting computation of secondary eigenvector estimates.

This procedure is detailed in FIG. 5 for an arbitrary number R of dominant eigenvectors. In step 5.1, the eigenvector order index r is set to 1, indicating the principal eigenvector. In step 5.2, the initial covariance matrix $A_1$ is set to $\hat{\Sigma}_m[n]$. An estimate of the principal eigenvector $u_m[n]$ is then obtained in step 5.3 based on $A_r$ and according to the procedure outlined in FIG. 4. The eigenvector estimator 46/$m$ then verifies in step 5.4 whether all R eigenvectors have been computed. If not, in step 5.5, it computes an estimate of the rth order eigenvalue according to $$\hat{\lambda}_r = \hat{u}_{m,r}^H A_r \hat{u}_{m,r}. \tag{14}$$

and, in step 5.6, subtracts the corresponding eigenvector from $A_r$ according to $$A_{r+1} = A_r - \hat{\lambda}_r \hat{u}_{m,r} \hat{u}_{m,r}^H. \tag{15}$$

It then increments the index r in step 5.7 and repeats the steps 5.3 to 5.6 for the subsequent eigenvectors.

The output signals $y_1, ..., y_M$ from the dominant subspace filters 40/0, ..., 40/M, i.e., the outputs of the common preprocessing section 40, are used by per-user signal processors 60/0, ..., 60/M to provide user-specific estimated received signals $z_0, ..., z_M$, respectively, which are estimates of the M+1 desired signals, each signal processor using the outputs of all of the dominant subspace filters 40/0, ..., 40/M to produce its respective estimate.

It will be appreciated that the common preprocessing section 40 described with reference to FIGS. 2 to 5 yields a set of signals with a reduced number of dimensions for further processing. This set of signals, or basis, is adapted through long-term adaptation since it tracks only the subspace structure of the channels, not their instantaneous behaviour.

This long-term loop (which corresponds to FIG. 3) need only be performed once every tenth of a second. This estimation interval can correspond to several hundred packets. On the other hand, the method associated with the per-user processors 60/0, . . . 60/M is a short-term loop (to be described hereafter for the preferred embodiment with reference to FIG. 7) which typically must be performed once per packet.

The signal processors 60/0, . . . 60/M can take a number of forms. According to this preferred embodiment where the dominant subspace filters 40/0, . . . , 40/M are space-time principal eigenfilters, as described previously, the signal processors 60/0, . . . , 60/M simply comprise weight-and-sum structures across the eigenfilter outputs, as illustrated in FIG. 6.

Figure 6:
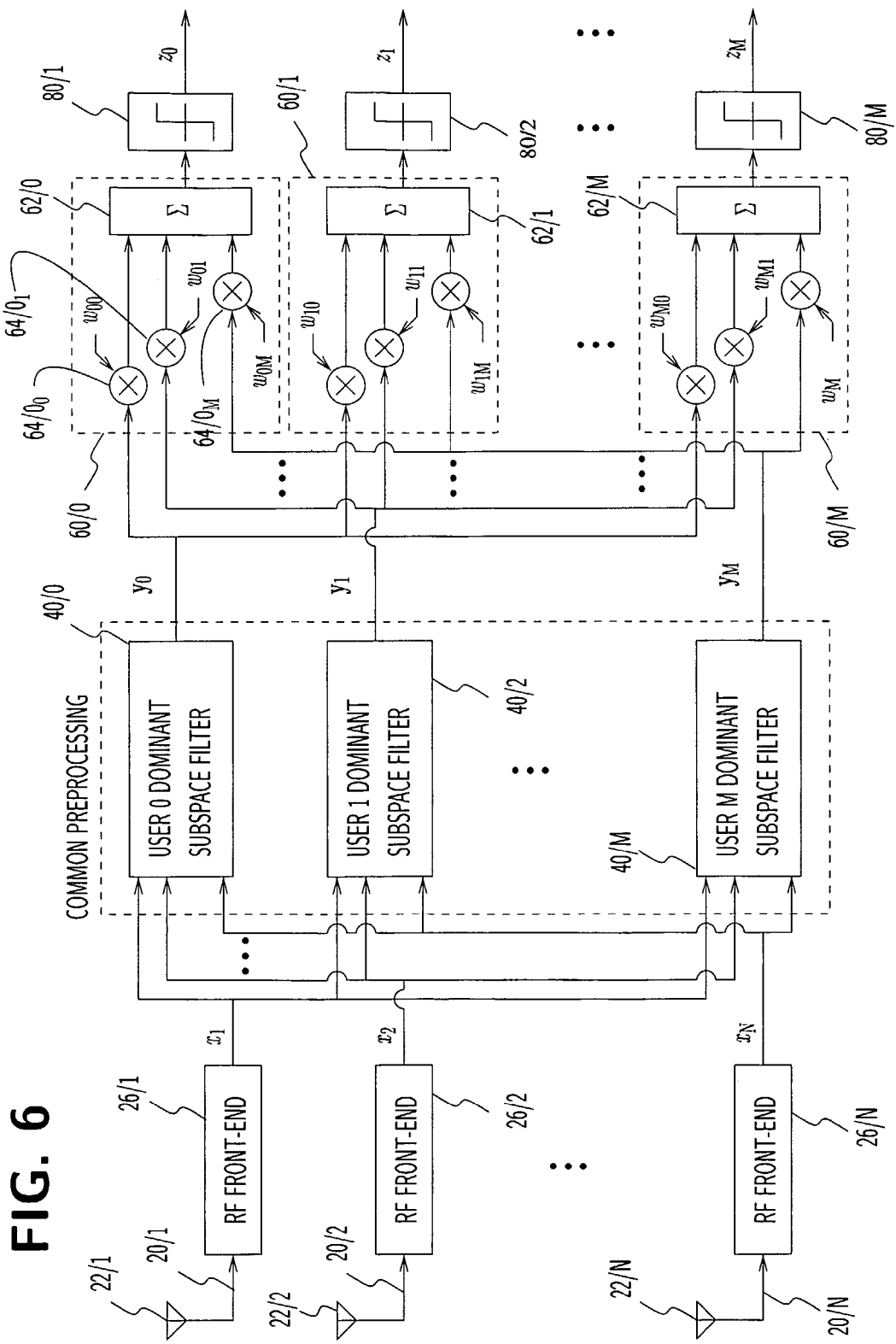
FIG. 6 is a block schematic diagram of a modified receiver system.

Referring to FIG. 6, signal processors 60/0, . . . , 60/M are identical so only one will be described, namely signal processor 60/0. It comprises a plurality of multipliers 64/0$_{00}$, . . . , 64/0$_M$ which apply weights w$_{00}$, . . . , w$_{0M}$ to subspace signals y$_0$, . . . , y$_M$, respectively, from the dominant subspace filters 40/0, . . . , 40/M. As will be described later, the weights w$_{00}$, . . . , w$_{0M}$ are derived in dependence upon substantially instantaneous channel characteristics, and updated. Means for deriving and updating these weights would be known to persons skilled in this art and so, for purposes of clarity, this means is not shown in FIG. 6

The weighted signals are then summed by combiner 62/0 whose output z$_0$ is fed to the detector 80/0 (see also FIG. 1). It should be noted that each of the other signal processors 40/1, . . . , 40/M also uses all of the output signals y$_0$, . . . , y$_M$ to obtain its respective one of outputs z$_1$, . . . , z$_M$.

It is also important to note that, should transmission be momentarily interrupted (such as in bursty data communications), no problem occurs since the weights are estimated afresh in every interval.

In step 7.1, the eigenvector estimator 46/m (FIG. 2) waits for the next packet to start. Upon acquiring a packet, in step 7.2 the estimator stores the portion of the packet which corresponds to the training sequence in a buffer (not shown). In step 7.3, it computes the estimate of the (M+1)×(M+1) short-term covariance matrix R$_{yy}$ of the eigenfilter bank's output vector y as follows:

$$\hat{R}_{yy} = \frac{1}{K}\sum_{k=1}^{K} y[k]y[k]^H. \quad (16)$$

No training sequence is necessary since, at this point, there is no need to discriminate between individual transmitted signals. Furthermore, the same matrix R$_{yy}$ is used by all users so this step need only be performed once per loop if all users' training sequences are synchronized.

In step 7.4, the estimator sets user index m to 0 and in step 7.5 it estimates user m's (M+1)×1 signature vector over the eigenfilter bank's outputs using the known training sequence transmitted by user m, i.e.

$$d_m = \frac{1}{K}\sum_{k=1}^{K} y[k]s_m^*[k]. \quad (17)$$

The training sequence will be provided by the training sequence generator 42/m which is part of eigenfilter 40/m (FIG. 2). The generator 42/m will then occasionally (when there is an intersection with the longer estimation interval) feed the "long-term" estimation in dominant subspace filter 40/m and the "short-term" estimation in processor 60/m simultaneously.

Figure 7:
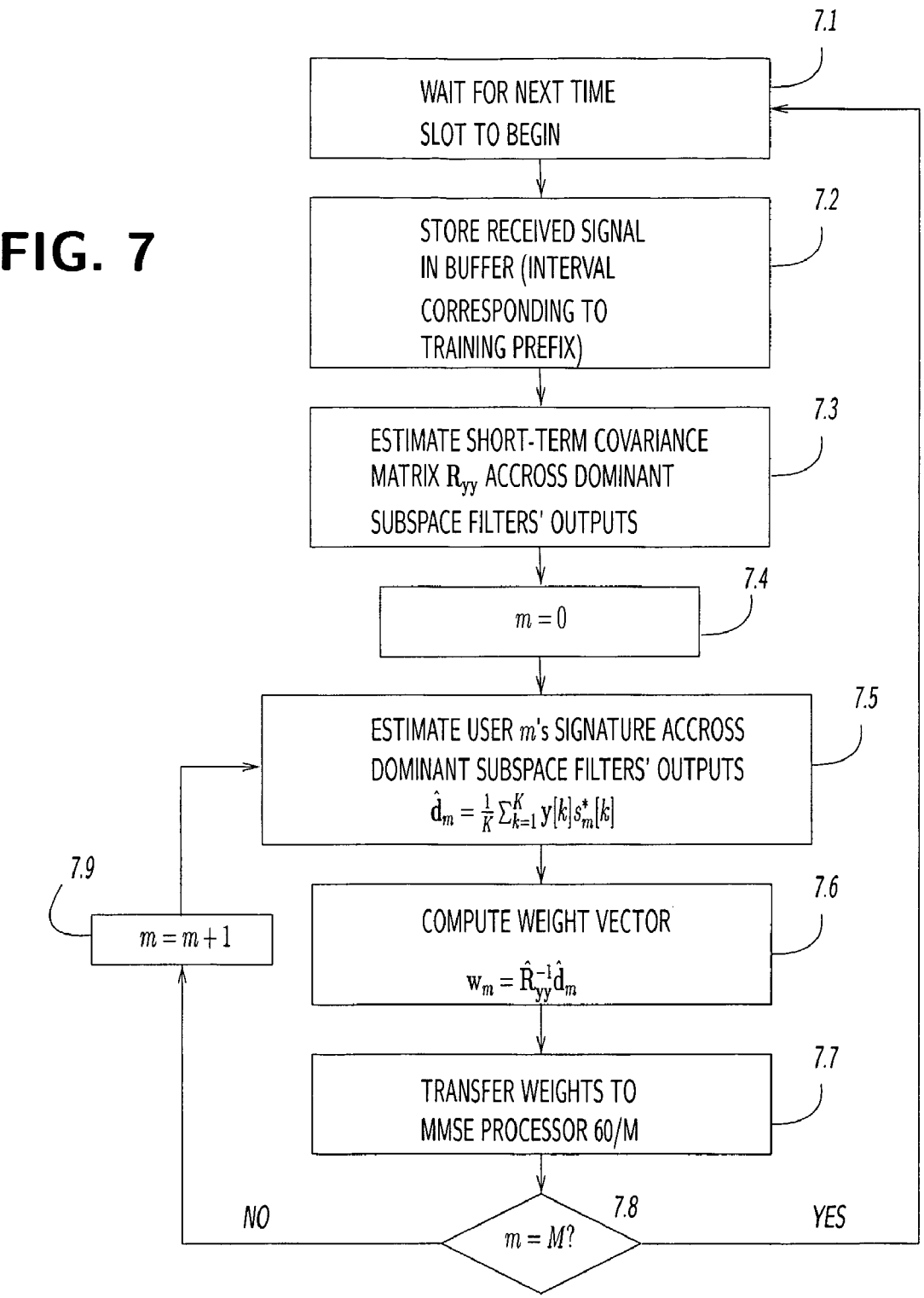
FIG. 7 is a flowchart depicting adaptation of weights to changing channel conditions.

Indeed, although the "short-term" loop of FIG. 7 typically will be performed on the order of 100 times more often than the "long-term" loop of FIG. 3, both can use the same training sequences, presumably available in every packet. However, the long-term loop will obviously use fewer of them.

It should be noted that the "short-term" covariance matrix and the channel estimates all should preferably be estimated over the same set of received samples (which correspond to training sequences sent simultaneously by all users) to ensure statistical consistency and prevent serious performance degradation.

In step 7.6, the estimator computes the weight vector w$_m$ which minimizes the mean-square error according to $$w_m = \hat{R}_{yy}^{-1}\hat{d}_m. \quad (18)$$

In step 7.7 the estimator 46/m transfers the weights obtained thereby to the signal processor 60/m. The estimator 46/m then determines, in step 7.8, whether the weights in all signal processors have been updated. If they have, the estimator returns to step 7.1 to await the next time slot and repeat the procedure. If they have not, the estimator increments index m in step 7.9 and repeats steps 7.5 through 7.8 to update the next processor. Steps 7.5 to 7.9 are repeated until all of the processors 60/0, . . . , 60/M have had their weights updated and step 7.8 finds m=M.

The embodiment described above with reference to FIG. 6 is designated "space-time eigenfiltering followed by MMSE combining".

To recapitulate, embodiments of the present invention can be described in algorithmic fashion as comprising two loops, vis. long-term and short-term. The long-term loop can be summarized as follows:

For every user m,
(i) The short-term covariance matrix of user m's signature over all NL taps of eigenfilter m is estimated on the basis of a known training sequence transmitted by user m;
(ii) The short-term estimate is used to update a running estimate of the long-term-averaged covariance matrix of user m's channel estimate (eqn. 11);
(iii) Using the running estimate of the long-term covariance matrix and the estimate of its dominant eigenvector from the previous iteration as a starting point, said running estimate is updated by performing one or more iterations of the power method (eqn. 12). If secondary eigenfilters are implemented, the same procedure applies for updating the secondary eigenfilter except that the dominant eigenvector is a priori subtracted from the covariance matrix estimate.
(iv) The computed weights (i.e. elements of the estimated eigenvector(s)) are transferred to the mth dominant subspace filter.
(v) The start of the next long-term training interval is awaited, and steps (i) to (iv) then are repeated.

The short-term loop can be summarized as follows:
1. The (M+1)×(M+1) short-term covariance matrix R$_{yy}$ of the eigenfilter bank's outputs is estimated;

For every user m,
2. User m's (M+1)×1 signature vector is estimated over the eigenfilter bank's outputs;
3. The weight vector $w_m = \hat{R}_{yy}^{-1} \hat{d}_m$ is computed;
4. The weights are transferred to the mth combiner.
5. The start of the next short-term training interval (next packet transmission by mth user) is awaited, and then the loop (steps 2 to 4) is repeated.

Alternative Embodiments

The signal processors 60/0, ..., 60/M could also include equalization, thus performing space-time processing. Such an extension is relatively straightforward to one skilled in the art and has the advantage of improving the performance (at the cost of additional complexity) in terms of signal quality and/or alleviating the need for many subspace dimensions in the preprocessing section 40 in order to obtain a given level of performance.

In an alternative embodiment, the eigenfilter banks 48/0, ..., 48/M perform strictly spatial processing, leaving all temporal processing to the per-user signal processors 60/0, ..., 60/M. The eigenfilter banks 48/0, ..., 48/M then have the structure depicted in FIG. 2 but with only one column of weights, i.e. L=1. Such an embodiment is designated "spatial eigenfiltering followed by MMSE space-time processing".

It should be noted that the latter embodiment provides better performance gains but a smaller complexity reduction than "space-time eigenfiltering followed by MMSE combining". In fact, a net complexity reduction compared with respect to conventional space-time processing can only be obtained if the number of antenna elements is greater than the number of users. However, this is usually the case even in conventional space-time processors in order to provide some gain against multipath fading in addition to spatial discrimination of users' signals.

While it is general practice to assume that the channels can be considered static over the length of a block (i.e., the length of a block is significantly smaller than the channel correlation time), the present invention is applicable equally well in other cases where continuous tracking (using adaptive algorithms such as the least-mean-square (LMS) or the Kalman filtering algorithm) is necessary.

If, in fact, continuous tracking is implemented, it may not be necessary to provide frequent training sequences. Indeed, both subspace filtering and weight computation updates can be performed using past decisions as training symbols, provided the latter are reliable ("decision-directed adaptation"). Training sequences, while less frequent, would still be required to: (1) initialize the system when a new link was formed so that its first decisions would be reliable enough to start the tracking procedure; and (2) periodically reset the system to minimize errors due to tracking.

Blind adaptation techniques could also be used, in which case training sequences would not be required at all. Likewise, the principles of the invention apply equally well to analog waveforms as opposed to digitally-modulated signals.

The transmitting stations need not be limited to using a single antenna. If they have multiple antennas, thus forming multiple-input, multiple-output (MIMO) links, embodiments of the invention as described here can be modified appropriately in a number of ways while retaining the essence and advantages of the invention. For example, each transmitter antenna element belonging to the same user could have at the receiver its own dominant subspace filter. Thus, an ensemble of dominant subspace filters would feed a single per-user signal processor which could perform standard MIMO reception techniques such as layered space-time (LST) successive cancellation.

Error-correction coding, whether unidimensional or bidimensional (in MIMO links), can also be incorporated in ways that should be obvious to a skilled practitioner of the art.

Likewise, a variety of alternatives to linear MMSE processing can be considered for the per-user processors 60/0, ..., 60/M without departing from the scope of the invention. Possibilities include decision-feedback processing, delayed decision-feedback, multi-user or MIMO decision-feedback maximum-likelihood sequence estimation (MLSE), etc.

The basis signals matched to each user could be formed using alternative techniques which are not based on the subspace structure of the channels. They could, for example, be based on estimates of the main directions-of-arrival characterizing each user's signal.

The invention can also be applied to CDMA systems. Thus, for example, the usual despreading could be performed at the outputs of the subspace filters 40/0 ... 40/M. Alternatively, a bank of despreaders could be provided at the input of the preprocessing section 40 and supply all of the despread signals to each of the dominant subspace filters, Complexity Reduction For the purpose of comparing complexity, an example will be considered of a 10 Mb/s system with packets of 68 bytes (roughly the size of an ATM cell). A guard byte is inserted between each pair of successive packets. If there are 8 users (i.e. M=7) who send packets simultaneously once every ten slots on the same carrier, since there are 18115.94 slots per second, the users of interest are transmitting at a rate of 1811.59 packets per second. At this rate, channels typically will be sufficiently different from one packet to the next due to multipath fading to warrant retraining of the per-user processors 60/0 ... 60/M at every packet. It will also be assumed that all adaptive filters have a length of 10 symbol-spaced taps; each packet contains a known training sequence of 32 bits; and the array has 10 elements (i.e. N=10)

The long-term covariance matrix is assumed to have a worst-case 90% correlation time of 0.5 s [9]; its estimate will be estimated every 0.1 s and the power iteration will also be performed every 0.1 s. Furthermore, it is assumed that diagonal loading (i.e. adding a small constant to all elements of the diagonal) is used whenever it is necessary to invert a covariance matrix larger than the length of the training sequence (i.e. larger than 32×32) since it might otherwise be singular under these conditions.

Table 1 illustrates the relative numerical complexity of the two proposed structures versus standard MMSE space-time processing in terms of the number of multiplication and addition operations required. All figures are totals for all 8 users.

TABLE 1

Relative numerical complexity of proposed structures compared with conventional MMSE space-time processing.

|  | standard MMSE | spatial eigenfilter + S-T MMSE | S-T eigenfilter + MMSE comb. |
|---|---|---|---|
| long-term adaptation (per iteration) | 8267200 mult. 8260550 adds. | 15320 mult. 14800 adds. | 1413200 mult. 1372000 adds. |
| short-term adaptation (per iteration) | $1.498 \cdot 10^{10}$ mult. $1.496 \cdot 10^{10}$ adds. | 4271360 mult. 4266840 adds. | 7808 mult. 7644 adds. |
| TOTAL (per second) |  | $7.738 \cdot 10^{9}$ mult. $7.730 \cdot 10^{9}$ adds. | $2.828 \cdot 10^{7}$ mult. $2.757 \cdot 10^{7}$ adds. |

Theory of Operation

While not wishing to be limited by theory, an explanation of the theory of operation will now be given to facilitate understanding of the preferred embodiments.

Given an eigendecomposition of the long-term average covariance matrix of the signal (i.e. its subspace structure), the eigenvector corresponding to the largest eigenvalue constitutes what will be called here the primary eigenfilter. Formally, the N×N long-term correlation matrix (where N is the number of receiving antenna elements at the base station) of signal $s_m(t)$ (transmitted by the mth out of M+1 users) in a flat-fading environment can be defined as $$\Sigma_m = <x_m(t)x_m(t)^H>, \qquad (19)$$

where $$x_m(t) = c_m(t)s_m(t), \qquad (20)$$

and $x_m(t)$ is the received signal from user m, $c_m(t)$ is the N×1 baseband equivalent vector channel between user m and the array (also called user m's spatial signature), $s_m(t)$ is the useful transmitted signal from user nm and the expectation <•> can be interpreted as either the time average over a period of time long enough to eliminate short-term channel fluctuations or an ensemble average over the distribution of possible channel realizations.

It is well-known that, in almost all terrestrial propagation environments narrowband (i.e. flat fading) wireless channels can be accurately represented in the short-term as either zero mean (Rayleigh-type fading) or non-zero mean (Rician-type fading) complex gaussian variables. It follows that the vector $c_m$ taken at any time instant is a complex gaussian vector characterized by its long-term covariance matrix (which is equal to $\Sigma_m$ in the Rayleigh-fading case) and its mean vector $\mu_m$ where $$\Phi_m = <(c_m - \mu_m)(c_m - \mu_m)^H>, \qquad (21)$$

is the general definition of the long-term covariance matrix of user m's vector channel.

Without loss of generality, the remainder of this description will assume that the fading is Rayleigh and user m's covariance matrix can thus be denoted by $\Sigma_m$ without ambiguity.

For frequency-selective fading channels, the correlation matrix can be defined as a frequency-dependent matrix:

$$\Sigma_m(f) = <\mathfrak{I}[c_m(t,\tau),\tau]\mathfrak{I}[c_m(t,\tau),\tau]^H>_t, \qquad (22)$$

where $\mathfrak{I}[\bullet,\tau]$ denotes the Fourier transform taken over the delay $\tau$ variable and $<\bullet>_t$ denotes averaging over the time variable t. Also, the dispersive channel impulse response $c_m(t,\tau)$ is defined as the echo received at time t+τ originating from an impulse sent at time t.

Consideration will be given first to the primary spatial eigenfilter in the general case of frequency-selective fading channels. For spatial filtering only, development proceeds from a "frequency-flat" covariance matrix for signal m, obtained by further frequency- or delay-averaging:

$$\Sigma_m \frac{1}{f_{max} - f_{min}} \int_{f_{min}}^{f_{max}} \Sigma_m(f) df = <c_m(t,\tau)c_m(t,\tau)^H>_{(t,\tau)}, \qquad (23)$$

It should be noted that although the analysis presented here is in the frequency domain, the preferred embodiments described hereinafter are implemented in the time domain.

The two definitions for $\Sigma_m$ (in the delay domain and the frequency domain) can be proven equivalent through Parseval's relation.

The primary spatial eigenfilter for signal m is then simply the eigenvector of $\Sigma_m$ corresponding to its largest eigenvalue. Its length is equal to the number of antenna elements and it is implementable as a set of weights used in combining the outputs of the array.

Statistically, it can be shown to be the fixed combination of weights providing the highest average signal output without tracking the multipath fading. Some analytical and simulation results have indicated that the long-term correlation matrix changes relatively slowly even with mobile subscribers and can in general be assumed fixed for periods of the order of a second [9]. This assumption has also been exploited to form the basis of downlink beamforming systems in [10] and [11]. In the broadband wireless context, it is reasonable to expect that the rate of change would be even slower since the subscribers are fixed. This implies that, in all cases, the eigenfilters can be computed in the background using a long-term tracking adaptation system demanding a negligible numerical effort. This is where the complexity advantage of this invention lies, as described in the "preferred embodiments" section.

If there are M+1 signals and the desired signal is signal $s_0$, let us define a spatial transformation on the input vector which can take the form $$y[n] = Ux[n] = U\delta[n] * x[n], \qquad (24)$$

where δ[n] is the Kronecker delta function, x[n] is the array input vector at time index n and $$U = \begin{bmatrix} u_0^H \\ u_1^H \\ \vdots \\ u_M^H \end{bmatrix}, \quad (25)$$

is an (M+1)×N matrix with $u_m$ being the primary spatial eigenfilter of the mth signal as described above. At the output of this transformation, the correlation matrix of the mth signal is expressed $$\hat{\Sigma}_m(f) = U\Sigma_m(f)U^H \text{ for all } f \in [f_{min}, f_{max}], \quad (26)$$

and the desired signal signature at the output of transformation U becomes $$d_0(f) = Uc_0(f) \text{ for all } f \in [f_{min}, f_{max}], \quad (27)$$

where $c_0(f)$ is the desired signal signature prior to the transformation.

It follows that the performance of an MMSE space-time combiner using the vector y[n] as input can be analyzed using known techniques and formulas for standard linear MMSE adaptation parametrized on the modified covariance matrices.

The rest of this section comprises a performance analysis in the frequency domain of the embodiment with space-time subspace filtering, without adaptive equalization and further assuming without loss of generality that the dominant subspace filters have one dimension.

Development proceeds by defining the prefiltering transformation (i.e. the eigenfilter bank) corresponding to the primary eigenvectors on "frequency-extended" space-time vectors:

$$\breve{y} = \breve{y}_1 = \breve{U}_1 \breve{x}, \quad (28)$$

where $$\breve{x} = \Delta_b \left[ x^H\left(f_{min} + \frac{\Delta_b}{2}\right), x^H\left(f_{min} + \frac{3\Delta_b}{2}\right), \ldots, x^H\left(f_{max} - \frac{\Delta_b}{2}\right) \right], \quad (29)$$

is the $NN_b \times 1$ frequency-extended array input vector obtained by splitting the band of interest into $N_b$ bins of width $\Delta_b$ significantly smaller than the coherence bandwidth (i.e. the fading can be considered flat within a single bin). Likewise $\breve{y}$ is the $(M+1)N_b \times 1$ frequency-extended vector of the eigenfilter outputs and is expressed $$\breve{y}^H = \Delta_b \left[ y^H\left(f_{min} + \frac{\Delta_b}{2}\right), y^H\left(f_{min} + \frac{3\Delta_b}{2}\right), \ldots, y^H\left(f_{max} - \frac{\Delta_b}{2}\right) \right], \quad (30)$$

where each element of vector $\breve{y}$ is a complex number representing a superposition of flat fading channels and y(f) is the M+1×1 frequency-dependent output vector of the space-time eigenfilter bank. Also, it should be noted that $\breve{y}$ is vector of size $(M+1)N_b \times 1$. Also, $$\breve{U}_1 = \begin{bmatrix} \breve{u}_{10}^H \\ \breve{u}_{11}^H \\ \vdots \\ \breve{u}_{1M}^H \end{bmatrix}, \quad (31)$$

where $\breve{u}_{1m}$ is the frequency-extended form of the principal space-time eigenfilter corresponding to signal $s_m$.

All those quantities are time-varying (except for U which is fixed in the short-term) but time dependence is omitted for clarity.

The system performance can be assessed by defining "frequency-crunched" channel vectors:

$$\bar{d}_m = \sum_{k=1}^{N_b} d_m\left(f_{min} + \frac{(2k-1)\Delta_b}{2}\right)\Delta_b, \quad (32)$$

where $$\Delta_b = \frac{f_{max} - f_{min}}{N_b}$$

is the width of each aforementioned frequency bin and $d_m(f)$ is an (M+1)×1 vector defining user m's signature after the transformation $\breve{U}$ such that its frequency extended version $\breve{d}_m = \breve{U}\breve{c}_m$. Furthermore, $\breve{c}_m$ is a frequency-extended vector defined in the same manner as in eqn. (29).

The above operation can be rewritten as a filter linear transformation of the form $$\bar{d}_m = V\breve{d}_m, \quad (33)$$

where V is an $(M+1) \times (M+1)N_b$ matrix of the form $$V = \begin{bmatrix} 1 & 0 & 0 & (M-1 \text{ zeros}) & \cdots & 1 & 0 & 0 & (M-1 \text{ zeros}) \\ 0 & 1 & 0 & (M-1 \text{ zeros}) & \cdots & 0 & 1 & 0 & (M-1 \text{ zeros}) \\ 0 & 0 & 1 & (M-1 \text{ zeros}) & \cdots & 0 & 0 & 1 & (M-1 \text{ zeros}) \\ \vdots & \vdots & \vdots & \vdots & & \vdots & \vdots & \vdots & \vdots \end{bmatrix}, \quad (34)$$

and $\breve{d}_m$ is the frequency-extended version of the signature $d_m$. The corresponding short-term covariance matrix is given by $$\bar{R}_{I+N} = \sum_{m=1}^{M} \bar{d}_m \bar{d}_m^H + I_{M+1}\sigma^2 \quad (35)$$

The output of a linear MMSE combiner taking y as input but which does not perform temporal processing (i.e. equalization) can be written $$z = \breve{w}^H \breve{y}. \quad (36)$$

Since only a single weight multiplies the output of each space-time filter, the extended weight vector is spectrally flat. In other words, $$w(f) = w. \quad (37)$$

Therefore the extended weight $(M+1)N_n \times 1$ vector has the form $$\breve{w}^H = [w^H, w^H, \ldots, w^H]. \quad (38)$$

This implies that the output can be expressed $$z = w^H \bar{y},$$  (39)

where $$\bar{y} = \Delta_b \sum_{k=1}^{N_b} y\left(f_{min} + (2k-1)\frac{\Delta_b}{2}\right).$$  (40)

This can also be written as a linear transformation $$\bar{y} = V\check{y}.$$  (41)

From MMSE filtering theory, the optimal weight vector in this context is $$w_{opt} = \bar{R}_{I+N}^{-1} \bar{d}_0.$$  (42)

Therefore, the optimum MMSE performance of space-time eigenfiltering followed by a linear MMSE combiner is $$\mu_0 = \bar{d}_0^H \bar{R}_{I+N}^{-1} \bar{d}_0.$$  (43)

By virtue of the transformation in equation (33), it is obvious that $\bar{d}_0$ is a complex gaussian vector with covariance matrix $$\bar{\Sigma}_0 = V\check{U}\check{\Sigma}_0 \check{U}^H V^H,$$  (44)

and that $\bar{R}_{I+N}$ is equivalent to a short-term interference-plus-noise covariance matrix obtained from a fictional M+1 element array in a flat fading environment. Each of its interference terms is obtained from a complex gaussian vector parametrized on appropriately transformed covariance matrices as per equation (44).

While this approach reduces complexity considerably compared to standard space-time processing by exploiting a multiuser channel basis, it does so at the cost of reduced performance. Specifically, the robustness against fading (ISI) will be reduced somewhat. In cases where this is not acceptable, the system can be augmented by the addition of a second dimension to the subspaces (thus implementating secondary eigenfilters) or more dimensions to the subspace filters.

The output of the secondary bank of eigenfilters is obtained, as in equation (28), by defining a prefiltering transformation corresponding to the secondary eigenvectors:

$$\check{y}_2 = \check{U}_2 \check{x},$$  (45)

where $$\check{U}_2 = \begin{bmatrix} \check{u}_{20}^H \\ \check{u}_{21}^H \\ \vdots \\ \check{u}_{2M}^H \end{bmatrix},$$  (46)

and $\check{u}_{2m}$ is the principal space-time eigenfilter corresponding to signal ($s_m$).

It follows that in a system extended to include a secondary eigenfilter bank, the overall output vector of the prefiltering section is defined:

$$\check{y} = \begin{bmatrix} y_{10} \\ \vdots \\ y_{1M} \\ y_{20} \\ \vdots \\ y_{2M} \end{bmatrix} = \begin{bmatrix} \check{y}_1 \\ \check{y}_2 \end{bmatrix} = \begin{bmatrix} \check{U}_1 \\ \check{U}_2 \end{bmatrix} \check{x}.$$  (47)

In this context, user m's signature becomes $$\check{d}_m = \begin{bmatrix} \check{U}_1 \\ \check{U}_2 \end{bmatrix} c_m,$$  (48)

after the prefiltering transformation. Likewise, user m's frequency-crunched signature becomes:

$$\bar{d}_m = \begin{bmatrix} V \\ V \end{bmatrix} \check{d}_m,$$  (49)

The rest of the development is identical to the case where only the primary eigenfilters are used. Similar generalizations can likewise be devised in a straightforward fashion for dominant subspaces with any number of dimensions.

It should be noted that like the MMSE combiners, the eigenfilter basis itself is also implemented using a series of taps in a space-time arrangement. However, two factors conspire to make the amount of work involved in adapting these taps negligible.

Since the eigenfilters can be considered fixed in the short-term, the adaptation takes place in a very long-term context compared with the MMSE combiner taps. The proposed adaptation scheme here is based on the power iteration method.

Only one basis is required to accommodate a plurality (up to M+1) of MMSE combiners.

INDUSTRIAL APPLICABILITY

Embodiments of the invention would be useful in receivers in stations that receive multiple signals simultaneously, such as (i) base stations in cellular communications systems or access points in wireless LANs; (ii) relay stations or terminal stations in ad hoc or unlicensed or packet radio networks capable of maintaining multiple links simultaneously; and (iii) terminal or access points of multiple-input multiple-output (MIMO) systems.

Embodiments of the present invention may provide a less costly solution in terms of the processing power, the hardware complexity, or both. In fact, they can provide a reduction in complexity of an order of magnitude with respect to a canonical linear space-time receiver, yet with minimal performance degradation.

It should be appreciated that the present invention is not limited to the foregoing embodiments but could be applied equally well in other cases where continuous tracking (using adaptive algorithms such as LMS) is necessary.

The reduced complexity aspect of preferred embodiments of the present invention stems from (i) the shared nature of the common preprocessing section, i.e. it is reused for all users; and (ii) the fact that it is adapted slowly, i.e. is less demanding in terms of hardware and/or software complexity.

It will be appreciated that the invention is not limited to receivers employing space-time processing but embraces receivers employing space-frequency processing, for example using Fast Fourier Transforms, or even strictly spatial processing.

Although embodiments of the invention have been described and illustrated in detail, it is to be clearly understood that the same are by way of illustration and example only and not to be taken by way of the limitation, the scope of the present invention being limited only by the appended claims.

DEFINITIONS

In this Specification

A "channel" refers to the relationship between a transmitted signal and a corresponding received signal.

A "vector channel" refers either to a channel with a single input and multiple outputs (SIMO) or a channel with multiple inputs and a single output (MISO). Each entry in a channel vector describes the amplitude and phase of the corresponding channel component.

A "dispersive channel" or "wideband channel" is a channel with an impulse response significantly longer than a symbol period, thus resulting in overlap between subsequent transmitted symbols, i.e. intersymbol interference (ISI). Such a channel cannot be described adequately with a single complex gain. It can either be described as a continuous or discrete (i.e. symbol-spaced samples) function of delay in the time domain, or as a continuous function of frequency in the spectral domain.

A "narrowband channel" or "flat fading channel" has an impulse response shorter than a symbol period and can thus be described by a single complex gain (or a vector of the same in the case of a vector channel).

A "space-time channel" is a vector channel which is also dispersive and can thus be described as a space-time matrix of complex gains, or a frequency-dependent vector.

A "covariance matrix" is a time or frequency-averaged outer product of a vector quantity or a matrix quantity. In the context of this disclosure, either quantity is either a vector signal or a vector channel. The covariance matrix of a wireless channel characterizes the long-term statistics which underlie the rapid and random instantaneous fluctuations typical of such channels. The fact that such covariance matrices vary at a much slower rate than the channels they characterize is exploited by embodiments of the present invention to reduce their complexity.

A channel "subspace" is a multidimensional space made up of a subset of the dimensions making up the N-dimensional space characterizing an N-element channel vector. A "dominant subspace" is a subspace corresponding to the most significant dimensions of the channel, i.e. a subset of orthogonal directions which, on average, contain most of the channel's energy.

REFERENCES

[1] J. G. Proakis, Digital Communications, 3rd ed. New York: McGraw-Hill, 1995, pages 152-163.

[2] S. Verdu, Multiuser Detection. Cambridge: Cambridge University Press, 1998, pages 154-213.

[3] R. D. Gitlin et al., U.S. Pat. No. 6,188,718, "Methods and apparatus for reducing cochannel interference in a mixed-rate communication system," issued Feb. 13, 2001.

[4] C. H. Barratt, U.S. Pat. No. 5,592,490, "Spectrally efficient high capacity wireless communication systems," issued Jan. 7, 1997.

[5] R. H. Roy, III and B. Ottersten, U.S. Pat. No. 5,515,378, "Spatial division multiple access wireless communication systems," issued May 7, 1996.

[6] B. Ottersten et al., U.S. Pat. No. 5,828,658, "Spectrally efficient high capacity wireless communication systems with spatio-temporal processing," issued Oct. 27, 1998.

[7] J. Salz, "Digital transmission over cross-coupled linear channels," AT&T Tech. J., vol. 64, no. 6, July-August 1985, pp. 1147-1159.

[8] B. R. Petersen and D. D. Falconer, "Equalization in cyclostationary interference," Technical Report SCE-90-01, Dept. of Systems and Computer Engineering, Carleton University, January 1990.

[9] S. Roy and D. D. Falconer, "Modelling the narrowband base station correlated diversity channel," in Proc. CTMC'99, Vancouver, Canada, June 1999.

[10] C. Farsakh and J. A. Nossek, "Spatial covariance based downlink beamforming in an SDMA mobile radio system," IEEE Trans. Comm., vol. 46, no. 11, pp. 1497-1506, November 1998.

[11] D. Gerlach, Adaptive Transmitting Antenna Arrays at the Base Station in Mobile Radio Networks, PhD dissertation, Stanford University, Stanford, U.S., August 1995.

[12] G. H. Golub and C. F. Van Loan, Matrix Computations. Baltimore; Johns Hopkins University Press, 1989.

[13] M. V. Clark, Diversity and Equalization in Digital Cellular Radio, PhD disseration, University of Canterbury, Christchurch, New Zealand, 1992.

The invention claimed is:

1. An array receiver for processing signals received from a plurality (M+1) of co-channel transmitting users via an array antenna having an array of (N) antenna elements to obtain a set of user-specific estimated received signals ($z_0, \ldots, z_M$) each corresponding to a respective one of said transmitting users, said array receiver having:

radio frequency units (26/1, ..., 26/N) for conversion of signals from the array antenna to provide a corresponding set of (N) antenna element signals ($x_1, x_2, \ldots, x_N$), respectively, where N is at least equal to the number (M+1) of transmitting users, each of the antenna element signals ($x_1, x_2, \ldots, x_N$) comprising information from each of the plurality (M+1) of transmitting users, a common preprocessing section (40) for receiving and processing the (N) antenna element signals ($x_1, x_2, \ldots, x_N$) from the radio frequency units (26/1 ... 26/M) to provide a plurality (M+1) of basis signals ($y_0, \ldots, y_M$), and a plurality (M+1) of signal processing units ($60_0, \ldots, 60_M$) each for processing said basis signals ($y_0, \ldots, y_M$) to provide a respective one of said user-specific estimated received signals ($z_0, \ldots, z_M$), wherein the common preprocessing section (40) comprises filtering means (40/1, ..., 40/M) for sampling each of the (N) antenna element signals ($x_1, x_2, \ldots, x_N$) and combining resulting samples of at least some of said antenna element signals ($x_1, x_2, \ldots, x_N$) to provide said plurality of (M+1) basis signals ($y_0 \ldots, y_M$), each of the basis signals ($y_0, \ldots, y_M$) comprising a different combination of the antenna element signals ($x_1, x_2, \ldots, x_N$) and having $\mu$ dimensions spanning a dominant subspace containing most of the energy from a respective one of the transmitted user signals, said (M+1) basis signals $(y_0, \ldots, y_M)$ together having fewer space-time dimensions $(\mu \times (M+1))$ than the space-time dimensions $(N \times L)$ of the (N) combined antenna element signals $(x_1, x_2, \ldots, x_N)$, where L is the maximum length of the channel impulse response in symbol periods, and updating means for periodically updating parameters of the filtering means ($40/1, \ldots, 40/M$) used for deriving each particular basis signal such that each of the user-specific estimated received signals $(z_0, z_1, \ldots z_M)$ will exhibit a desired optimized concentration of energy;

and wherein each of said signal processing units ($60_0, \ldots, 60_M$) has a plurality of inputs coupled to the common preprocessing section (40) for receiving therefrom all of the (M+1) basis signals $(y_0, \ldots, y_M)$, and is adapted for processing and combining at least some of said (M+1) basis signals $(y_0, \ldots, y_M)$ to produce a respective one of said set of user-specific estimated received signals $(z_0, \ldots, z_M)$ for a corresponding desired one of the plurality (M+1) of transmitting users.

2. A receiver according to claim 1, wherein the updating means comprises means for adjusting said parameters in dependence upon channel characteristics of all user channels.

3. A receiver according to claim 1, wherein the number of basis signals is equal to the number of desired user signals.

4. A receiver according to claim 1, wherein the common preprocessing section (40) comprises M+1 dominant subspace filters ($40/0, \ldots, 40/M$) producing a set of basis signals $y_m = [y_{m,1}, \ldots, y_{m,\mu}]$ where m is the index of the filter, and $m = 0, 1, \ldots, M$, said basis signals $y_m$ being projections of the input signals $(x_{11}, x_{12}, \ldots, x_{1L}, x_{21}, x_{22}, \ldots, x_{2L}, \ldots, x_{N1}, x_{N2}, x_{NL})$ onto the $\mu$ dimensions of the subspace occupied by signal m which carry the most energy.

5. A receiver according to claim 1, wherein the filtering means comprises a plurality of filters each comprising a filter matched to a respective one of the space-time channel signatures of the desired users.

6. An array receiver for processing signals received from a plurality of transmitting users via an array antenna having an array of N antenna elements providing a set of antenna signals $(x_1, x_2, \ldots, x_N)$, respectively, each comprising information from each user, wherein said receiver has a common preprocessing section for sampling each of the antenna element signals $(x_1, x_2, \ldots, x_N)$ and processing the samples of at least some of said antenna signals to form a plurality of basis signals $(y_0, \ldots, y_M)$ together having fewer space-time dimensions than the space-time dimensions of the combined antenna signals, and a plurality of signal processing units each having a plurality of inputs coupled to the common preprocessing section for receiving all of the basis signals, each processing unit processing and combining said basis signals to produce a respective one of a set of estimated received signals $(z_0, \ldots, z_M)$ each for a corresponding desired one of the users, the common preprocessing section comprising filtering means for combining all of the antenna signals $(x_1, x_2, \ldots, x_N)$ to provide said plurality of basis signals $(y_0, \ldots, y_M)$, each of the basis signals comprising a different combination of the antenna signals, each of the signal processing units combining the basis signals to provide a user-specific output signal, and updating means for periodically updating parameters of the filtering means used for deriving each particular basis signal such that each user-specific output signal will exhibit a desired optimized concentration of energy of that desired user's received signal as received by the array antenna, and wherein each of the processor units comprises means for weighting the basis signals $(y_0, \ldots, y_M)$ before combining same, the weights $(w_{00}, \ldots, w_{MM})$ being adjusted in dependence upon channel characteristics of all user channels, and the parameters of the filtering means are updated less frequently than the weights $(w_{00}, \ldots, w_{MM})$ of the processor units.

7. An array receiver for processing signals received from a plurality of transmitting users via an array antenna having an array of N antenna elements providing a set of antenna signals $(x_1, x_2, \ldots, x_N)$, respectively, each comprising information from each user, wherein said receiver has a common preprocessing section for sampling each of the antenna element signals $(x_1, x_2, \ldots, x_N)$ and processing the samples of at least some of said antenna signals to form a plurality of basis signals $(y_0, \ldots, y_M)$ together having fewer space-time dimensions than the space-time dimensions of the combined antenna signals, and a plurality of signal processing units each having a plurality of inputs coupled to the common preprocessing section for receiving all of the basis signals, each processing unit processing and combining said basis signals to produce a respective one of a set of estimated received signals $(z_0, \ldots, z_M)$ each for a corresponding desired one of the users, the common preprocessing section comprising filtering means for combining all of the antenna signals $(x_1, x_2, \ldots, x_N)$ to provide said plurality of basis signals $(y_0, \ldots, y_M)$, each of the basis signals comprising a different combination of the antenna signals, each of the signal processing units combining the basis signals to provide a user-specific output signal, and updating means for periodically updating parameters of the filtering means used for deriving each particular basis signal such that each user-specific output signal will exhibit a desired optimized concentration of energy of that desired user's received signal as received by the array antenna, wherein the updating means comprises a training sequence generator for generating a training sequence for the corresponding user, covariance matrix estimation means responsive to the training sequence and the antenna signals for providing a covariance matrix embodying long-term statistics for the channel of that user, and eigenvector estimation means for extracting from said covariance matrix at least the dominant eigenvector constituting said linear combination, elements of said dominant eigenvector being applied to said filtering means as weights for updating said parameters.

8. A receiver for receiving signals from a plurality of transmitting users via an array antenna having an array of N antenna elements providing a set of antenna signals $(x_1, x_2, \ldots, x_N)$, respectively, each comprising information from each user, said receiver comprising a common preprocessing section followed by a plurality of receiver sections, each corresponding to a different one of the users and coupled to the outputs of the common preprocessing section, the preprocessing section sampling each of the antenna signals $(x_1, x_2, \ldots, x_N)$ and processing the samples of at least some of said antenna element signals to form a plurality of basis signals $(y_0, \ldots, y_M)$ together having fewer space-time dimensions than the space-time dimensions of the combined antenna signals, and a plurality of signal processing units each having a plurality of inputs coupled to the common preprocessing section for receiving all of the basis signals, each processing unit processing and combining said basis signals to produce a respective one of a set of estimated received signals $(z_0, \ldots, z_M)$ each for a corresponding desired one of the users, the common preprocessing section comprising (i) means for maintaining through periodic updates a set of dominant subspace filters, each of which being matched to one of the users of interest, and the outputs of which being used by the subsequent receiver sections, to be processed and combined in order to yield an estimate of the desired signal for each user of interest;

(ii) means for periodically estimating and/or updating the component weights of the dominant subspace filters by correlation, with a known training sequence or with the user's spreading code in a CDMA system or with any other signal strongly correlated with the user of interest's signal, in combination with appropriate temporal averaging to isolate subspace-level information, as opposed to instantaneous channel characteristics; and (iii) means for periodically or dynamically estimating and/or updating the component weights and/or any other parameters of interest of the receiver sections fed from the preprocessing section in a manner and at a rate such that instantaneous channel changes are tracked to provide a reliable and consistent estimate of the desired signal.

9. A method of receiving signals from a plurality of transmitting users via an array antenna having N antenna elements providing a set of antenna signals $(x_1, x_2, \ldots, x_N)$, respectively, each comprising information from each user, the method comprising the steps of:

sampling each of the antenna signals;

preprocessing the samples of at least some of said antenna element signals $(x_1, x_2, \ldots, x_N)$ to form a plurality of basis signals $(y_0, \ldots, y_M)$ together having fewer space-time dimensions than the space-time dimensions of the combined antenna signals, processing and combining said basis signals $(y_0, \ldots, y_M)$ to produce a set of estimated received signals $(z_0, \ldots, z_M)$ each for a corresponding one of the users, the preprocessing including the steps of
combining all of the antenna signals $(x_1, x_2, \ldots, x)$ to provide said plurality of basis signals $(y_0, \ldots, y_M)$ such that each of the basis signals comprises a different combination of the antenna signals, the processing and combining step comprising the step of combining the basis signals $(y_0, \ldots, y_M)$ to provide a series of user-specific output signals, the method further comprising the step of periodically updating parameters used for deriving each particular basis signal such that each user-specific output signal will exhibit a desired optimum concentration of energy of the received signal of that particular user as received by the array antenna, wherein the updating step adjusts said parameters in dependence upon channel characteristics of all user channels, each step of processing the basis signals weights the basis signals before combining same, and adjusts the weights in dependence upon channel characteristics of all user channels, and wherein the parameters are updated less frequently than the weights.

10. A method of receiving signals from a plurality of transmitting users via an array antenna having N antenna elements providing a set of antenna signals $(x_1, x_2, \ldots, x_N)$, respectively, each comprising information from each user, the method comprising the steps of:

sampling each of the antenna signals;

preprocessing the samples of at least some of said antenna element signals $(x_1, x_2, \ldots, x_N)$ to form a plurality of basis signals $(y_0, \ldots, y_M)$ together having fewer space-time dimensions than the space-time dimensions of the combined antenna signals, processing and combining said basis signals $(y_0, \ldots, y_M)$ to produce a set of estimated received signals $(z_0, \ldots, z_M)$ each for a corresponding one of the users, the preprocessing including the steps of
combining all of the antenna signals $(x_1, x_2, \ldots, x_N)$ to provide said plurality of basis signals $(y_0, \ldots, y_M)$ such that each of the basis signals comprises a different combination of the antenna signals, the processing and combining step comprising the step of combining the basis signals $(y_0, \ldots, y_M)$ to provide a series of user-specific output signals, the method further comprising the step of periodically updating parameters used for deriving each particular basis signal such that each user-specific output signal will exhibit a desired optimum concentration of energy of the received signal of that particular user as received by the array antenna, the method further comprising the step of generating a training sequence for each user, the updating step being responsive to the training sequence of a particular user and the antenna signals to provide a covariance matrix embodying long-term statistics for the channel of that user, and using eigenvector estimation means for extracting from said covariance matrix at least the dominant eigenvector, elements of said dominant eigenvector being employed for updating said parameters.

11. A method of receiving signals from a plurality of transmitting users using an array antenna having an array of antenna elements and a receiver comprised of a common prefiltering section followed by a plurality of receiver sections, each corresponding to a different one of the users and coupled to the outputs of the common prefiltering section, the method comprising the steps of (i) maintaining through periodic updates a set of dominant subspace filters, each matched to one of the users of interest, and the outputs of which being used by the subsequent receiver sections, to be processed and combined in order to yield an estimate of the desired signal for each user of interest;

(ii) periodically estimating and/or updating the component weights of the dominant subspace filters by correlation with at least one of (a) a known training sequence, (b) the user's spreading code where the method is used in a CDMA system, and (c) any other signal strongly correlated with the signal of the user of interest, in combination with appropriate temporal averaging to isolate subspace-level information, as opposed to instantaneous channel characteristics; and (iii) periodically or dynamically estimating and/or updating the component weights and/or any other parameters of interest of the receiver sections fed from the prefiltering section in a manner and at a rate such that instantaneous channel changes are tracked to provide a reliable and consistent estimate of the desired signal.

12. An array receiver system comprising an array antenna having a plurality (N) of antenna elements in combination with an array receiver for processing signals received from a plurality (M+1) of co-channel transmitting users via said array antenna to obtain a set of user-specific estimated received signals ($z_0, \ldots, z_M$) each corresponding to a respective one of said transmitting users, wherein said array receiver has:

radio frequency units (26/1, ..., 26/N) for conversion of signals from the array antenna to provide a corresponding set of (N) antenna element signals ($x_1, x_2, \ldots, x_N$), respectively, where N is at least equal to the number (M+1) of transmitting users, each of the antenna element signals ($x_1, x_2, \ldots, x_N$) comprising information from each of the plurality (M+1) of transmitting users, a common preprocessing section (40) for receiving and processing the (N) antenna element signals ($x_1, x_2, \ldots, x_N$) from the radio frequency units (26/1 ... 26/M) to provide a plurality (M+1) of basis signals ($y_0, \ldots, y_M$), and a plurality (M+1) of signal processing units (60$_0$, ..., 60$_M$) each for processing said basis signals ($y_0, \ldots, y_M$) to provide a respective one of said user-specific estimated received signals ($z_0, \ldots, z_M$), wherein the common preprocessing section (40) comprises filtering means (40/1, ..., 40/M) for sampling each of the (N) antenna element signals ($x_1, x_2, \ldots, x_N$) and combining resulting samples of at least some of said antenna element signals ($x_1, x_2, \ldots, x_N$) to provide said plurality of (M+1) basis signals ($y_0, \ldots, y_M$), each of the basis signals ($y_0, \ldots, y_M$) comprising a different combination of the antenna element signals ($x_1, x_2, \ldots, x_N$) and having μ dimensions spanning a dominant subspace containing most of the energy from a respective one of the transmitted user signals, said (M+1) basis signals ($y_0, \ldots, y_M$) together having fewer space-time dimensions (μx(M+1)) than the space-time dimensions (N×L) of the (N) combined antenna element signals ($x_1, x_2, \ldots, x_N$), where L is the length of the channel impulse response in symbol periods, and updating means for periodically updating parameters of the filtering means (40/1, ..., 40/M) used for deriving each particular basis signal such that each of the user-specific estimated received signals ($z_0, z_1, \ldots, z_M$) will exhibit a desired optimized concentration of energy;

and wherein each of said signal processing units (60$_0$, ..., 60$_M$) has a plurality of inputs coupled to the common preprocessing section (40) for receiving therefrom all of the (M+1) basis signals $y_M$), and is adapted for processing and combining at least some of said (M+1) basis signals ($y_0, \ldots, y_M$) to produce a respective one of said set of user-specific estimated received signals ($z_0, \ldots, z_M$) for a corresponding desired one of the plurality (M+1) of transmitting users.

13. A method of receiving signals from a plurality (M+1) of co-channel transmitting users via an array antenna having an array of (N) antenna elements providing a set of antenna element signals ($x_1, x_2, \ldots, x_N$), respectively, to obtain a set of user-specific estimated received signals ($z_0, \ldots, z_M$) each corresponding to a respective one of said transmitting users, the method comprising the steps of:

using radio frequency units (26/1, ..., 26/N), converting signals from the array antenna to provide a corresponding set of (N) antenna element signals ($x_1, x_2, \ldots, x_N$), respectively, where N is at least equal to the number (M+1) of transmitting users, each of the antenna element signals ($x_1, x_2, \ldots, x_N$) comprising information from each of the plurality (M+1) of transmitting users, using a common preprocessing section (40), receiving and processing the (N) antenna element signals ($x_1, x_2, \ldots, x_N$) from the radio frequency units (26/1 ... 26/M) to provide a plurality (M+1) of basis signals ($y_0, \ldots, y_M$), and using a plurality (M+1) of signal processing units (60$_0$, ..., 60$_M$), processing said basis signals ($y_0, \ldots, y_M$) to provide said user-specific estimated received signals ($z_0, \ldots, z_M$), wherein the receiving and processing step comprises the steps of using filtering means (40/0, ..., 40/M), sampling each of the (N) antenna element signals ($x_1, x_2, \ldots, x_N$) and combining resulting samples of at least some of said antenna element signals ($x_1, x_2, \ldots, x_N$) to provide said plurality of (M+1) basis signals ($y_0, \ldots, y_M$), each of the basis signals ($y_0, \ldots, y_M$) comprising a different combination of the antenna element signals ($x_1, x_2, \ldots, x_N$) and having μ dimensions spanning a dominant subspace containing most of the energy from a respective one of the transmitted user signals, said (M+1) basis signals ($y_0, \ldots, y_M$) together having fewer space-time dimensions (μx(M+1)) than the space-time dimensions (N×L) of the (N) combined antenna element signals ($x_1, x_2, \ldots, x_N$), where L is the length of the channel impulse response in symbol periods, and periodically updating parameters of the filtering means (40/0, ..., 40/M) used for deriving each particular basis signal such that each of the user-specific estimated received signals ($z_0, z_1, \ldots z_M$) will exhibit a desired optimized concentration of energy;

and wherein the step of processing the basis signals ($y_0, \ldots, y_M$) comprises the steps of receiving from the common preprocessing section (40) all of the (M+1) basis signals ($y_0, \ldots, y_M$), and processing and combining at least some of said (M+1) basis signals ($y_0, \ldots, y_M$) to produce each of said set of user-specific estimated received signals ($z_0, \ldots, z_M$) for a corresponding desired one of the plurality (M+1) of transmitting users.

14. A method according to claim 13, wherein the updating step adjusts said parameters in dependence upon channel characteristics of all user channels.

15. A method according to claim 13, wherein the number of basis signals is equal to the number of desired user signals.

16. A method according to claim 13, wherein the step of preprocessing the samples uses M+1 dominant subspace filters to produce a set of basis signals $y_m=[y_{m,1}, \ldots, y_{m,\mu}]$ where m is the index of the filter, and m=0, 1, M, said basis signals $y_m$ being projections of the input signals ($x_{11}, x_{12}, \ldots, x_{1L}, x_{21}, x_{22}, \ldots, x_{2L}, x_{N1}, x_{N2}, x_{NL}$) onto the μ dimensions of the subspace occupied by signal m which carry the most energy.

17. A method according to claim 13, wherein the step of combining all of the antenna signals uses a plurality of filters each matched to a respective one of the desired users.

\* \* \* \* \*